(12) United States Patent
Kurata et al.

(10) Patent No.: US 8,956,755 B2
(45) Date of Patent: Feb. 17, 2015

(54) BATTERY AND BATTERY ASSEMBLY

(71) Applicant: Kabushiki Kaisha Toshiba, Minato-ku (JP)

(72) Inventors: Kengo Kurata, Saku (JP); Tatsuya Shinoda, Saku (JP); Mitsuhiro Hoshino, Saku (JP); Hideyuki Ishii, Maebashi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 13/745,444

(22) Filed: Jan. 18, 2013

(65) Prior Publication Data
US 2013/0130100 A1 May 23, 2013

Related U.S. Application Data

(63) Continuation of application No. PCT/JP2011/066367, filed on Jul. 19, 2011.

(30) Foreign Application Priority Data

Jul. 21, 2010 (JP) ................................. 2010-164260
Feb. 9, 2011 (JP) ................................. 2011-026298

(51) Int. Cl.
*H01M 2/02* (2006.01)
*H01M 2/30* (2006.01)
(Continued)

(52) U.S. Cl.
CPC ............... *H01M 2/30* (2013.01); *H01M 2/024* (2013.01); *H01M 2/043* (2013.01); *H01M 2/06* (2013.01); *H01M 2/1241* (2013.01); *H01M 2/206* (2013.01); *H01M 2/263* (2013.01); *H01M 2/305* (2013.01); *H01M 10/0525* (2013.01);
(Continued)

(58) Field of Classification Search
USPC .................................. 429/179, 178, 170, 175
See application file for complete search history.

(56) References Cited

U.S. PATENT DOCUMENTS 7,393,611 B2 7/2008 Hamada et al.
8,263,255 B2 9/2012 Byun et al.
(Continued)

FOREIGN PATENT DOCUMENTS

JP 11-329405 11/1999
JP 2000-150306 5/2000
(Continued)

OTHER PUBLICATIONS

International Search Report issued on Oct. 25, 2011 for PCT/JP2011/066367 filed on Jul. 19, 2011 with English translation of categories.
(Continued)

*Primary Examiner* — Jane Rhee
(74) *Attorney, Agent, or Firm* — Oblon, Spivak, McClelland, Maier & Neustadt, L.L.P.

(57) ABSTRACT

According to one embodiment, a battery includes a package can, an electrode group, a lid and a plurality of homopolar external terminals. The electrode group is provided in the package can and comprises a positive electrode and a negative electrode. The lid is provided to an opening part of the package can. The plurality of homopolar external terminals are provided on the lid and electrically connected to the positive electrode or negative electrode.

7 Claims, 19 Drawing Sheets

(51) Int. Cl.
  *H01M 2/04* (2006.01)
  *H01M 2/06* (2006.01)
  *H01M 2/12* (2006.01)
  *H01M 2/20* (2006.01)
  *H01M 2/26* (2006.01)
  *H01M 10/0525* (2010.01)
  *H01M 10/0587* (2010.01)

(52) U.S. Cl.
  CPC .......... *H01M10/0587* (2013.01); *Y02E 60/122* (2013.01); *Y02T 10/7011* (2013.01)
  USPC ............ 429/179; 429/178; 429/175; 429/170

(56) References Cited

U.S. PATENT DOCUMENTS

2010/0081048 A1    4/2010  Nansaka et al.
2011/0052976 A1*   3/2011  Ishii et al. ................... 429/178

FOREIGN PATENT DOCUMENTS

| JP | 2004-111308 | 4/2004 |
| JP | 2004-213937 | 7/2004 |
| JP | 2006-236790 | 9/2006 |
| JP | 2010-80355  | 4/2010 |
| JP | 2010-92592  | 4/2010 |
| JP | 2011-23142  | 2/2011 |
| JP | 2011-77039  | 4/2011 |

OTHER PUBLICATIONS

International Written Opinion issued on Oct. 25, 2011 for PCT/JP2011/066367 filed on Jul. 19, 2011.
English translation of the International Preliminary Report on Patentability issued Feb. 21, 2013 in PCT/JP2011/066367 filed Jul. 19, 2011.
Written Opinion of the International Searching Authority issued Oct. 25, 2011 in PCT/JP2011/066367 filed Jul. 19, 2011 (submitting English translation only, previously filed Jan. 18, 2013).

* cited by examiner

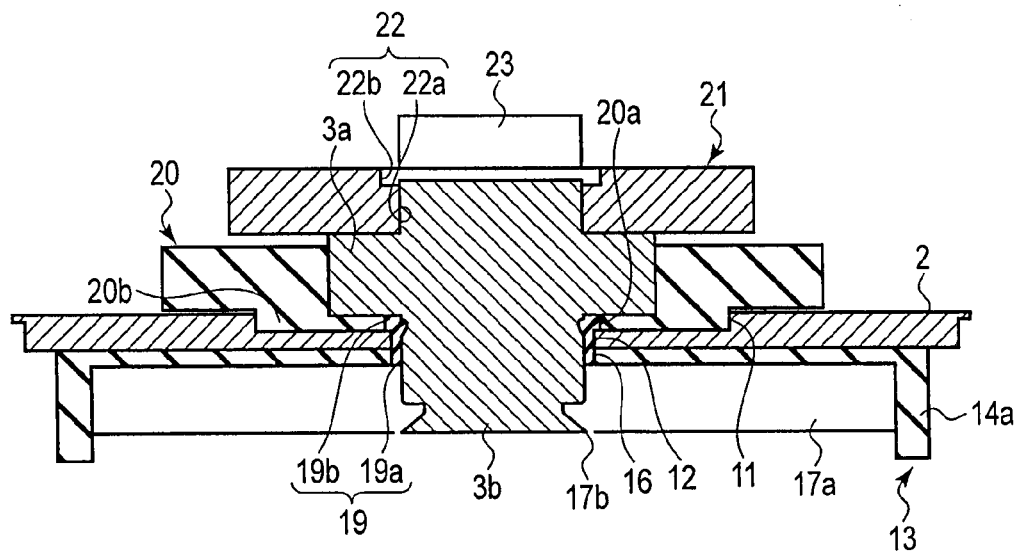
F I G. 5
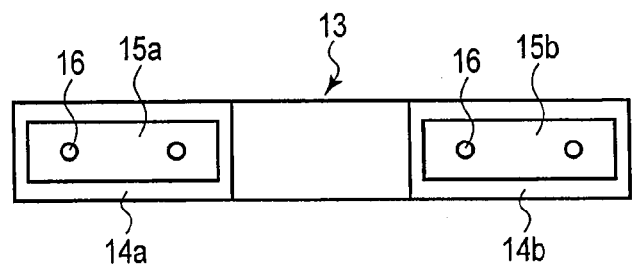
F I G. 6
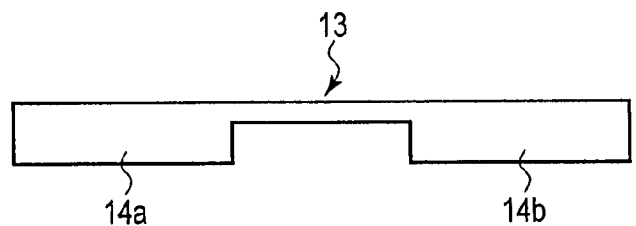
F I G. 7

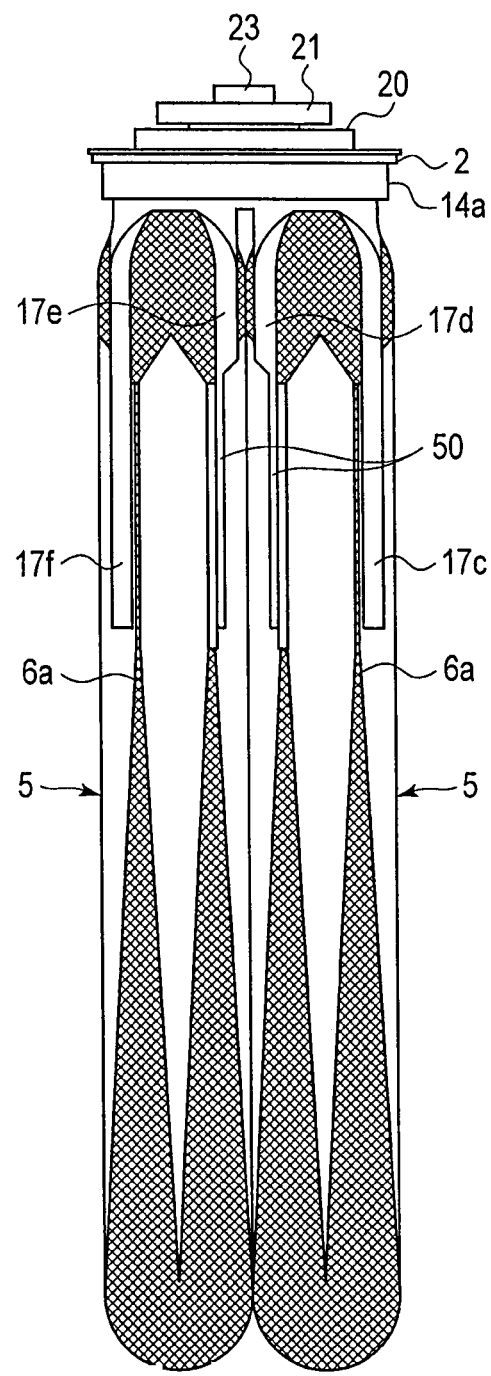
F I G. 9

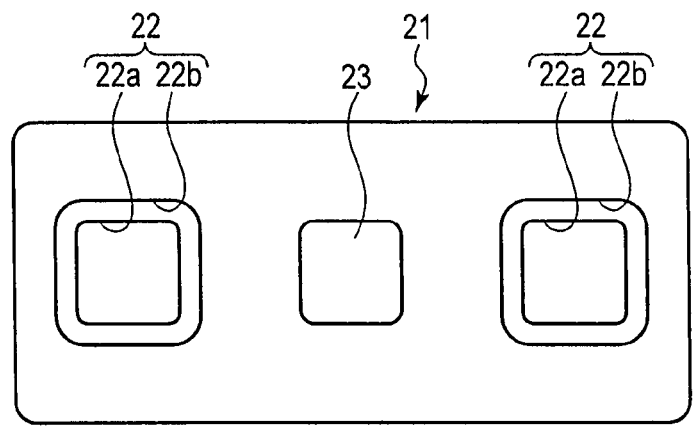
F I G. 10
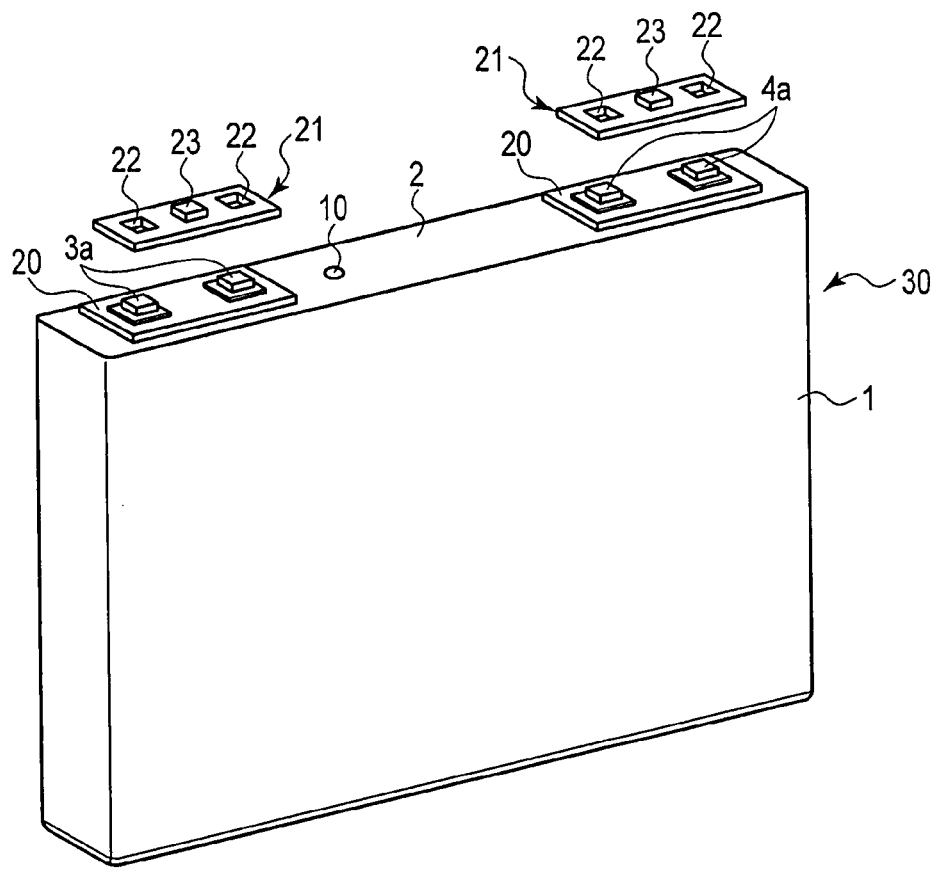
F I G. 11

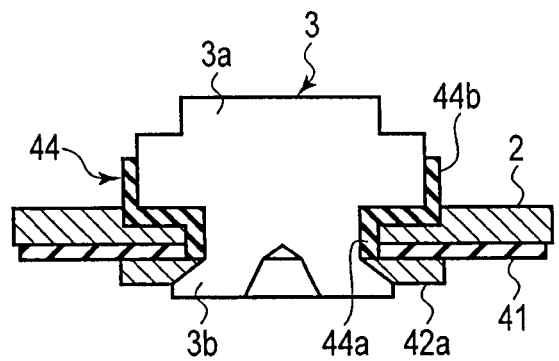
F I G. 18
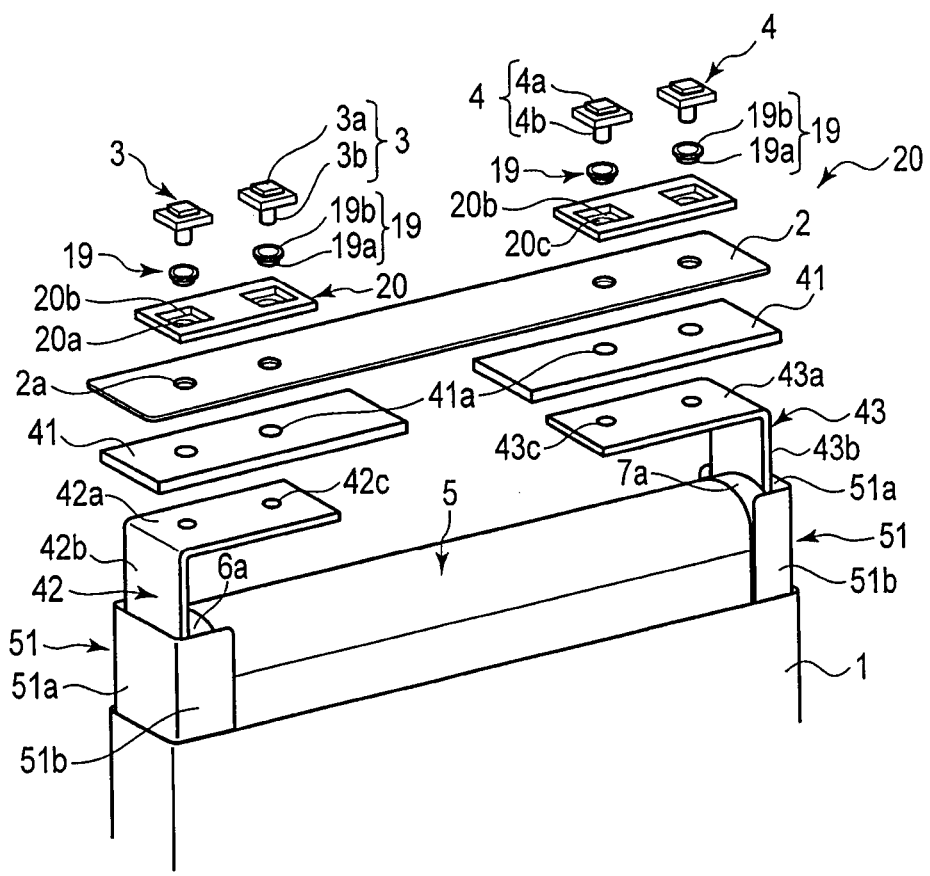
F I G. 19

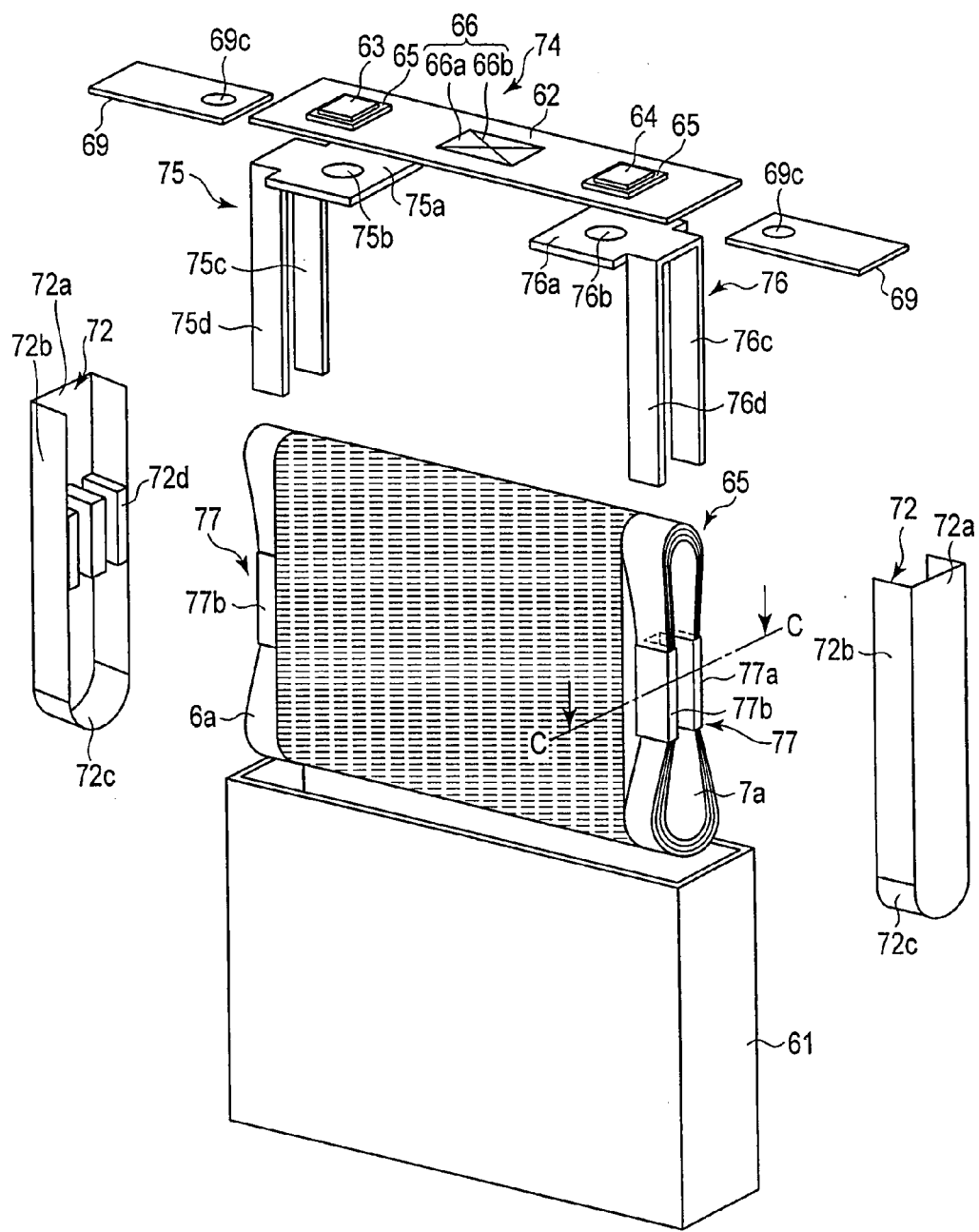
F I G. 33

BATTERY AND BATTERY ASSEMBLY

CROSS-REFERENCE TO RELATED APPLICATIONS

This application is a Continuation Application of PCT Application No. PCT/JP2011/066367, filed Jul. 19, 2011 and based upon and claiming the benefit of priority from Japanese Patent Application No. 2010-164260, filed Jul. 21, 2010 and Japanese Patent Application No. 2011-026298, filed Feb. 9, 2011, the entire contents of all of which are incorporated herein by reference.

FIELD

Embodiments of the present invention relates to a battery and a battery assembly.

BACKGROUND

The progress of electronic devices such as mobile telephones and personal computers demands that secondary batteries used in these devices should be small-sized and reduced in weight. As examples of high-density secondary batteries which can meet this demand, lithium ion batteries are given. On the other hand, secondary batteries such as lead-acid batteries and nickel metal hydride batteries are used as large-sized and large-capacity power sources represented by electric cars, hybrid vehicles, electric motorcycles, and forklifts. Enthusiastic development has been recently made towards the adoption of a lithium ion secondary battery having a high energy density. In light of this, the lithium ion secondary battery is under development to attain a large-sized and large-capacity one, taking long life and safety into account.

As the power sources for these applications, a battery pack is used in which many batteries connected in series or parallel to each other are accommodated because it has a high driving power.

The quantity of current extracted from individual batteries is increased along with advancement in upsizing and large-capacitization of a battery. For this, it is desirable to limit the Joule calorific value of an external terminal to a lower level.

Further, though battery external terminals are connected to each other by external leads to connect batteries in series or parallel, the stress applied to the external leads is directly applied to positive electrode terminals and negative electrode terminals and rotates the positive electrode and negative electrode terminals, prompting fears as to the dangers of external short-circuit failures.

Patent Literature 1 relates to a current collecting system of a battery or capacitor. Patent Literature 2, in turn, relates to a rectangular type secondary battery.

CITATION LIST

Patent Literature

Patent Literature 1: Jpn. Pat. Appln. KOKAI Publication No. 2000-150306
Patent Literature 2: Jpn. Pat. Appln. KOKAI Publication No. 2006-236790

BRIEF DESCRIPTION OF THE DRAWINGS

FIG. 5 is an enlarged sectional view of the section along the line V-V of FIG. 4;

FIG. 6 is a plan view of an internal insulating body;

FIG. 7 is a side view of an internal insulating body;

FIG. 9 is a developed side view of a battery shown in FIG. 1;

FIG. 10 is a plan view showing an external lead;

FIG. 11 is a partially exploded perspective view of a battery shown in FIG. 1;

FIG. 18 is an enlarged sectional view of the section along the line A-A of FIG. 17;

FIG. 19 is a partially exploded perspective view of a battery of a fifth embodiment;

FIG. 33 is a developed perspective view showing a rectangular type battery of a seventh embodiment.

DETAILED DESCRIPTION

An object of the embodiment of the present invention is to provide a battery and battery module capable of suppressing a rotation of an external terminal of a positive electrode or negative electrode when external force is applied to the external terminal.

Another object of the embodiment of the present invention is to provide a battery which is provided with a safety valve having a small variation in release pressure and has a high strength of a lid part even if the battery is a large-sized.

According to one embodiment, a battery includes a package can, an electrode group, a lid and a plurality of homopolar external terminals. The electrode group is provided in the package can and comprises a positive electrode and a negative electrode. The lid is provided to an opening part of the package can. The plurality of homopolar external terminals are provided on the lid and electrically connected to the positive electrode or negative electrode.

According to another embodiment, a battery includes a package can, an electrode group, a lid, a safety valve, a lead and an external terminal. The electrode group is provided in the package can and comprises a positive electrode and a negative electrode. The lid is provided to an opening part of the package can. The safety valve comprises a groove section formed on the lid. The lead comprises a support plate having a larger plate thickness than the lid and is electrically connected to at least one of the positive electrode and negative electrode. The external terminal is provided on the lid and electrically connected to the lead.

A battery according to embodiments of the present invention will be explained with reference to the drawings. It is to be noted that the present invention is not limited to these embodiments.

First Embodiment

Figure 1:
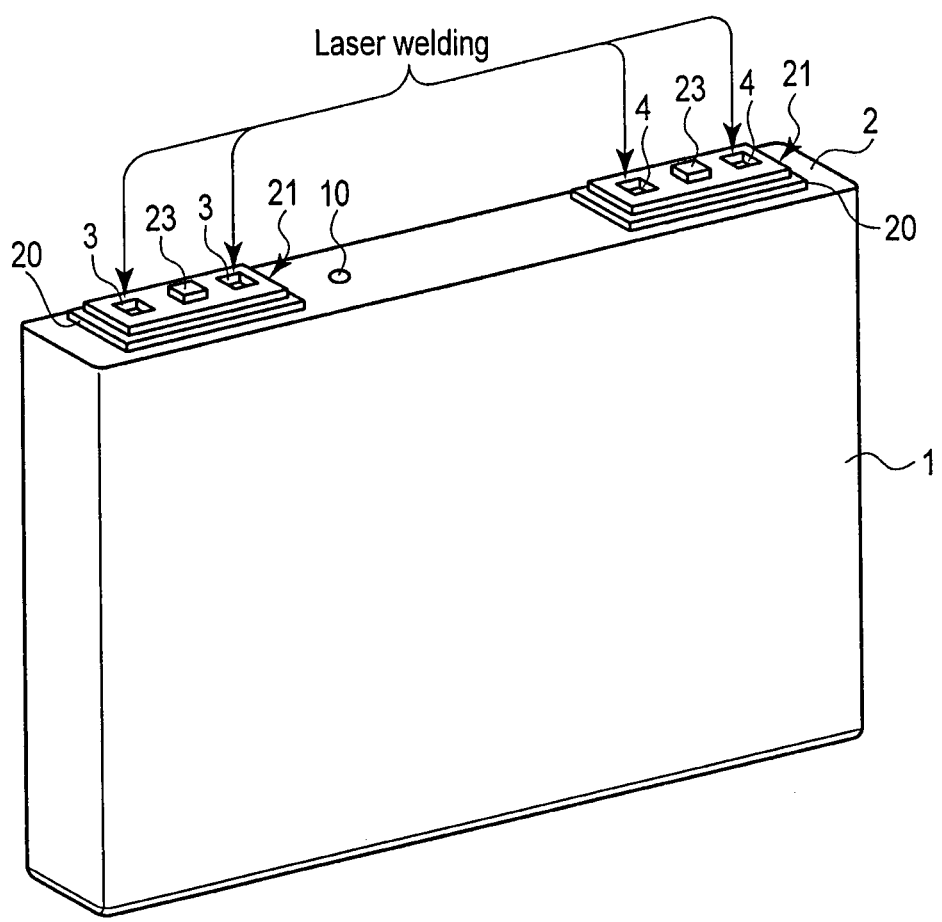
FIG. 1 is a perspective view of a battery according to a first embodiment.
Figure 2:
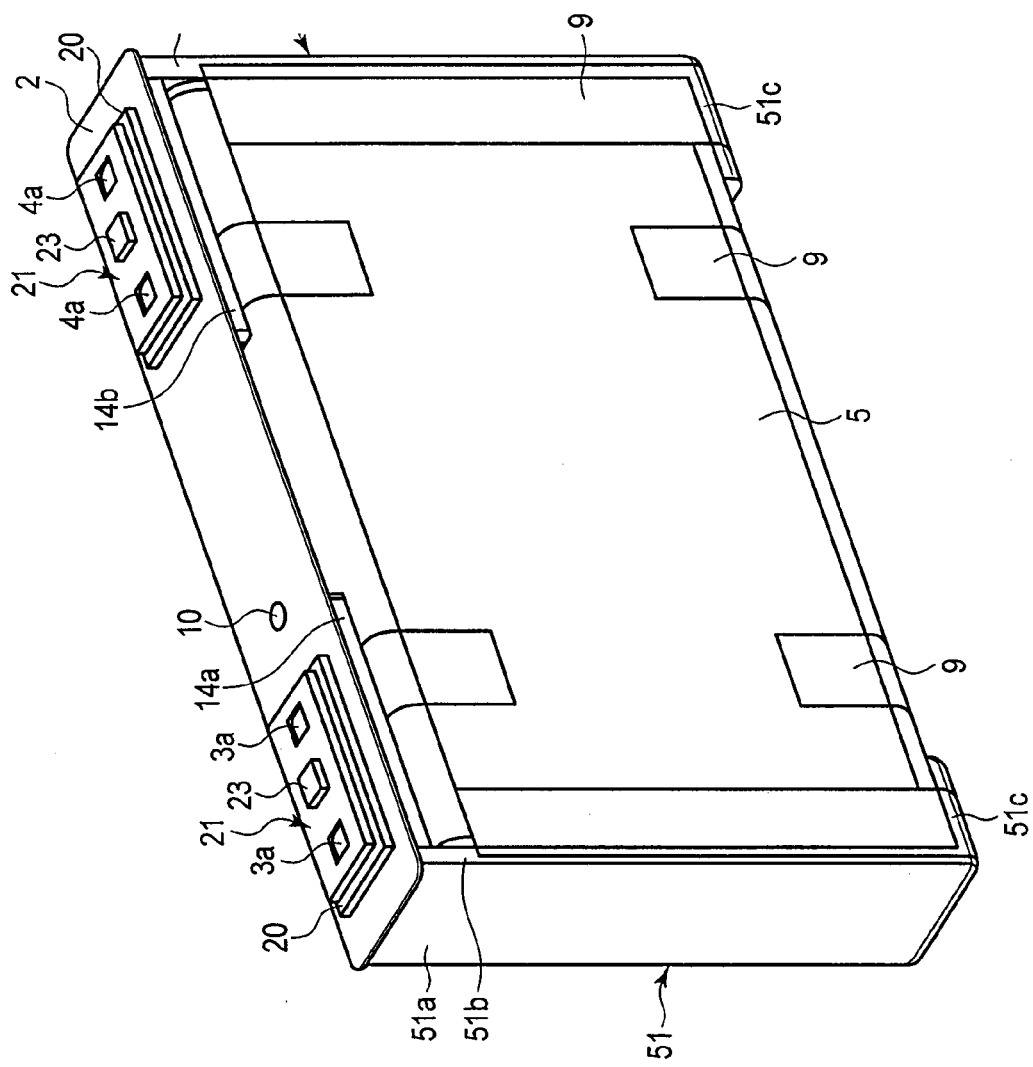
FIG. 2 is a developed perspective view of a battery shown in FIG. 1.

The battery shown in FIG. 1 is a closed and rectangular type nonaqueous electrolyte secondary battery. As shown in FIGS. 1 and 2, the nonaqueous electrolyte secondary battery comprises a package can 1, a lid 2, a positive electrode external terminal 3, a negative electrode external terminal 4, and two pairs of electrode groups 5.

As shown in FIG. 1, the package can 1 has a bottomed prismatic form and is made of a metal such as aluminum, aluminum alloy, iron, or stainless.

Figure 3:
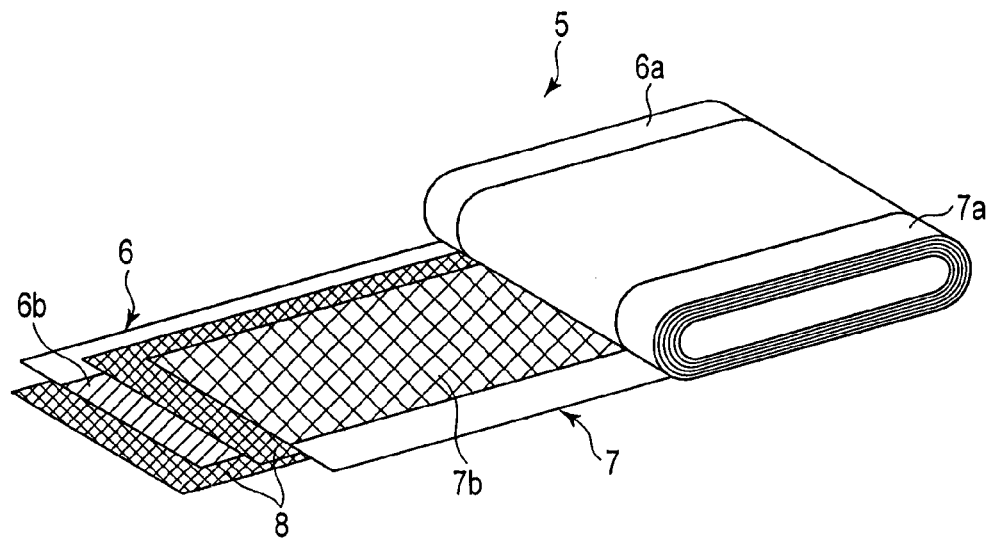
FIG. 3 is a developed perspective view of an electrode group used in a battery shown in FIG. 1.

As shown in FIG. 3, a flat type electrode group 5 is produced by winding a positive electrode 6 and a negative electrode 7 into a flat form with a separator being interposed therebetween. The positive electrode 6 includes a band-shaped positive electrode current collector made of, for example, a metal foil, a positive electrode current collector tab 6a constituted of one end part disposed parallel to the long side of the positive electrode current collector, and a positive electrode active material layer 6b formed on the positive electrode current collector excluding at least the part of the positive electrode current collector tab 6a. On the other hand, the negative electrode 7 includes a band-shaped negative electrode current collector made of, for example, a metal foil, a negative electrode current collector tab 7a constituted of one end part disposed parallel to the long side of the negative electrode current collector, and a negative electrode active material layer 7b formed on the negative electrode current collector excluding at least the part of the negative electrode current collector tab 7a.

The positive electrode 6, separator 8, and negative electrode 7 like this are wound in such a manner to displace the positive electrode 6 from the negative electrode 7. The positive electrode current collector tab 6a projects from the separator 8 in the direction of the coil axis of the electrode group and the negative electrode current collector tab 7a projects from the separator 8 in the opposite direction. Such a coil structure allows the electrode group 5 to have such a structure in which, as shown in FIG. 3, the spirally wound positive electrode current collector tab 6a projects from one end surface and the spirally wound negative electrode current collector tab 7a projects from the other. As shown in FIG. 2, the outermost periphery of the electrode group 5 is fixed by an insulating tape 9.

The electrode group 5 is impregnated with a liquid electrolyte (not shown).

As shown in FIG. 1, a rectangular plate lid 2 is seam-welded to an opening part of the package can 1 by a laser. The lid 2 is formed of a metal, for example, aluminum, aluminum alloy, iron, or stainless. The lid 2 and the package can 1 are desirably formed of the same type of metal. An injection port (not shown) for the liquid electrolyte is opened in the lid 2 and sealed with a seal lid 10 after the liquid electrolyte is injected.

Figure 4:
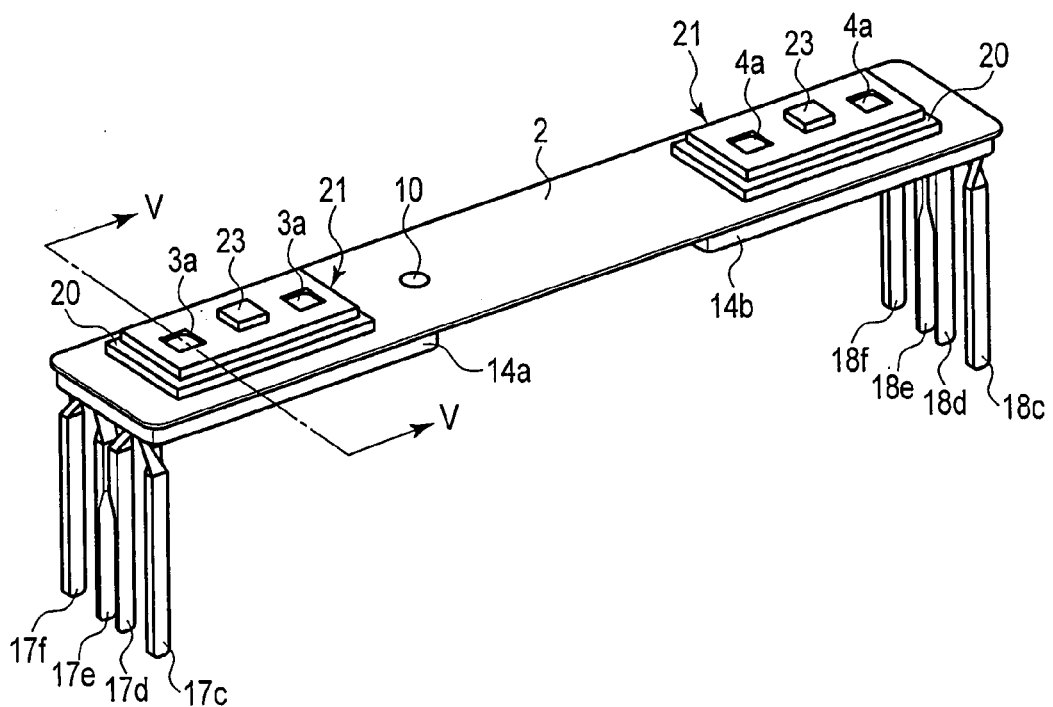
FIG. 4 is a perspective view showing the vicinity of a lid of a battery shown in FIG. 1.

As shown in FIGS. 1 and 2, the lid 2 comprises a plurality (for example, 2) of positive electrode external terminals 3 and a plurality (for example, 2) of negative electrode external terminals 4 which are fixed by caulking. FIG. 4 is a perspective view showing the lid to which the internal leads and external leads of the positive electrode and negative electrode are fixed, and FIG. 5 is a sectional view of the section along the line V-V of FIG. 4.

Two rectangular concave portions 11 are formed on the outside surface of the lid 2. One of these concave portions 11 is shown in FIG. 5. The positive electrode external terminal 3 is accommodated in one of the concave portions 11 and the negative electrode external terminal 4 is accommodated in the other. Each concave portion 11 comprises two through-holes 12.

An internal insulating body 13 is disposed on the backside of the lid 2. As shown in FIGS. 6 and 7, rectangular frame sections 14a and 14b are disposed on the left and right ends in the longitudinal direction of the internal insulating body 13. The positive electrode and negative electrode internal leads are accommodated in the concave portions 15a and 15b enclosed by the frame sections 14a and 14b. The concave portions 15a and 15b are each provided with two through-holes 16. The frame sections 14a and 14b are higher than the center of the internal insulating body 13 and functions as a spacer preventing the electrode group 5 from moving in a direction towards the lid 2.

A positive electrode internal lead 17 comprises a rectangular plate section 17a and current collecting sections 17c to 17f extended downward from the short side of the plate section 17a. As shown in FIG. 5, the plate section 17a of the positive electrode internal lead 17 is accommodated in the concave portion 15a of the internal insulating body 13. The plate section 17a comprises a through-hole 17b in the internal insulating body 13 at a position corresponding to the through-hole 16. The current collecting sections 17c and 17f by which the through-hole is flanked each have such a structure obtained by twisting the upper end of a strip-like plate extended downward from the short side of the plate section 17*a*. The upper end has an R-shape along the flexure of the electrode group 5 and a part other than the upper end has a linear form along the straight section of the electrode group 5. Further, each linear-shape section of the center current collecting sections 17*d* and 17*e* has a thinner wall thickness than the R-shape section. This structure is adopted to weld the part of the electrode group 5 which is clipped with a backup lead 50, to the current collecting sections 17*d* and 17*e* with high strength.

As shown in FIG. 4, a negative electrode internal lead 18 comprises a rectangular plate section 18*a* (not shown) and current collecting sections 18*c* to 18*f* extended downward from the short side of the plate section 18*a*. The plate section 18*a* of the negative electrode internal lead 18 is accommodated in the concave portion 15*b* of the internal insulating body 13. The plate section 18*a* comprises a through-hole 18*b* (not shown) in the internal insulating body 13 at a position corresponding to the through-hole 16. The current collecting sections 18*c* and 18*f* by which the through-hole is flanked each have such a structure obtained by twisting the upper end of a strip-like plate extended downward from the short side of the plate section 18*a*. The upper end has an R-shape along the flexure of the electrode group 5 and a part other than the upper end has a linear form along the straight section of the electrode group 5. Further, each linear-shape section of the center current collecting sections 18*d* and 18*e* has a thinner wall thickness than the R-shape section. This structure is adopted to weld the section of the electrode group 5 which is clipped with a backup lead 50, to the current collecting sections 18*d* and 18*e* with high strength.

As an insulating gasket used for the fixation caulking of the positive electrode external terminal 3 and negative electrode external terminal 4 and an external insulation body, the same material is used. As shown in FIG. 19, two insulating gaskets 19 exist for each of the positive electrode and negative electrode. The insulating gaskets 19 are each provided with a cylindrical cylinder section 19*a* and a flange section 19*b* formed like a sword guard at one opening end of the cylinder section 19*a*. As shown in FIG. 5, the cylinder section 19*a* of the insulating gasket 19 is inserted into the through-hole 12 in the concave portion 11 of the lid 2 and the under opening end of the cylinder section 19*a* is inserted into the through-hole 16 of the internal insulating body 13. The flange section 19*b* of the insulating gasket 19 covers the peripheral edge of the through-hole 12 in the concave portion 11 of the lid 2.

As shown in FIG. 19, there exist two external insulation bodies 20 as one for a positive electrode and another for a negative electrode. As shown in FIGS. 5 and 19, these external insulation bodies 20 are respectively provided with two rectangular pedestal sections 20*b* in which a through-hole 20*a* is opened. The surrounding of the pedestal section 20*b* is enclosed with side walls. Each external insulation body 20 is disposed in the concave portion 11 of the lid 2 and the flange section 19*b* of the insulating gasket 19 is inserted into the through-hole 20*a* of the external insulation body 20.

It is desirable that the external insulation body 20, insulation gasket 19, and internal insulating body 13 are all made of a resin molded product. A part important to secure air-tightness by fixation caulking is the insulating gasket 19 and it is therefore desirable to use a molded product using a resin material having a higher melting point than the external insulation body 20 and internal insulating body 13. This enables securement of air-tightness at high temperatures (for example, 100° C. or less). Further, when a material harder than the insulating gasket 19 is used as the external insulation body 20, the external insulation body can be improved in mechanical strength and therefore, the dangers of short circuits when the external terminals are rotated can be reduced.

The high-melting point resin material used for the insulation gasket 19 is preferably made of a fluororesin molded product superior in resistance to the liquid electrolyte. Typical examples of the resin may include a tetrafluoroethylene/perfluoroalkyl vinyl ether copolymer (hereinafter referred to as PFA) having a melting point of 300 to 310° C.

PFA preferably has a melt flow rate (hereinafter referred to as MFR) of 5 g/10 min or less. This limits the flow of a resin at high temperatures, resulting in improved air-tightness. MFR is measured at 372° C. under a load of 5 kg.

The resin to be used for the external insulation body 20 is preferably harder than that used for the insulating gasket 19, though there is no particular limitation to the resin. Specifically, the external insulation body desirably has a larger Rockwell hardness than the insulating gasket. This can prevent the occurrence of such a phenomenon that when rotational force acts primarily on the caulked part of the positive electrode and negative electrode external terminals 3 and 4, the external insulation body 20 is broken by the force applied to the external terminal head sections 3*a* and 4*a* and lid 2, thereby enabling prevention of short circuits when the external terminal head sections 3*a* and 4*a* touch the lid 2.

Because the Rockwell hardness of PFA is about R50 when PFA is used for the insulating gasket 19, examples of materials having a higher Rockwell hardness than PFA include a polypropylene (PP) having a R85 to 110 and melting point of 160 to 170° C., polyethylene terephthalate (PET) having a R110 to 120 and melting point of 264° C., and polyphenylene sulfide (PPS) having a R118 to 124 and melting point of 280 to 290° C. The above Rockwell hardness is defined according to JIS K 7202-2, Method for Calculation Plastic Hardness, Second section: Rockwell hardness.

The external insulation body 20 is desirably an injection molded body. PFA having a MFR of 5 g/10 min or less has difficulty with injection molding though air-tightness at high temperatures can be secured. When an injection molded product is used as the external insulation body 20, the degree of freedom of variation in shape is increased and also, each external insulation body 20 to be used for caulking the positive electrode terminal or negative electrode terminal allows the formation of indication of polarities such as "+", "−" marks and the use of different colors, making it easy to distinguish each polarity. Examples of resins which can be injection-molded include PP, PET, and PPS.

Although no particular limitation is imposed on the resin used for the internal insulating body 13, the degree of freedom of variation in shape is increased if the resin can be injection-molded. Specific examples of the resin include PP, PET, and PPS.

The positive electrode external terminal 3 is, as shown in FIG. 5, provided with a head section 3*a* and an axial section 3*b* extended downward from the head section 3*a*. The head section 3*a* comprises an upper section having almost the same dimension as the axial section 3*b* and a lower section having a form projecting externally from the axial section 3*b*. The negative electrode external terminal 4 comprises a head section 4*a* and an axial section 4*b* extended downward from the head section 4*a*. The head section 4*a* has the same shape as the head section 3*a* of the positive electrode external terminal 3. The head sections 3*a* and 4*a* of the positive electrode and negative electrode external terminals 3 and 4 are accommodated in a space enclosed by the flange section 19*b* of the insulating gasket 19 and a pedestal section 20*b* of the external insulation body 20.

The axial section 3b of the positive electrode external terminal 3 is inserted into the insulating gasket 19 disposed in the through-hole 12 of the lid 2 and in the through-hole 16 of the internal insulating body 13 and also inserted into the through-hole 17b of the plate section 17a of the positive electrode internal lead 17. The axial section 3b is deformed into a form having a broadened diameter by fixation caulking and fixed to the lid 2, internal insulating body 13, and positive electrode internal lead 17 by caulking. On the other hand, the axial section 4b of the negative electrode external terminal 4 is inserted into the insulating gasket 19 disposed in the through-hole 12 of the lid 2 and in the through-hole 16 of the internal insulating body 13 and also inserted into the through-hole 18b (not shown) of the plate section 18a of the negative electrode internal lead 18. The axial section 4b is deformed into a form having a broadened diameter by fixation caulking and fixed to the lid 2, internal insulating body 13, and negative electrode internal lead 18 by caulking. This ensures that the positive electrode and negative electrode external leads 3 and 4 and the lid 2 are fixed under the condition that insulation and air-tightness are kept, and further, the positive electrode and negative electrode external terminals 3 and 4 and the positive electrode and negative electrode internal leads 17 and 18 are fixed under the condition that electrical connection is kept. In order to further improve the electrical connection between the axial sections 3b and 4b of the positive electrode and negative electrode external terminals 3 and 4 and the positive electrode and negative electrode internal leads 17 and 18, it is preferable to fix the axial sections 3b and 4b to the peripheral edges of the through-holes of the positive electrode and negative electrode internal leads 17 and 18 by laser welding or the like.

Figure 8:
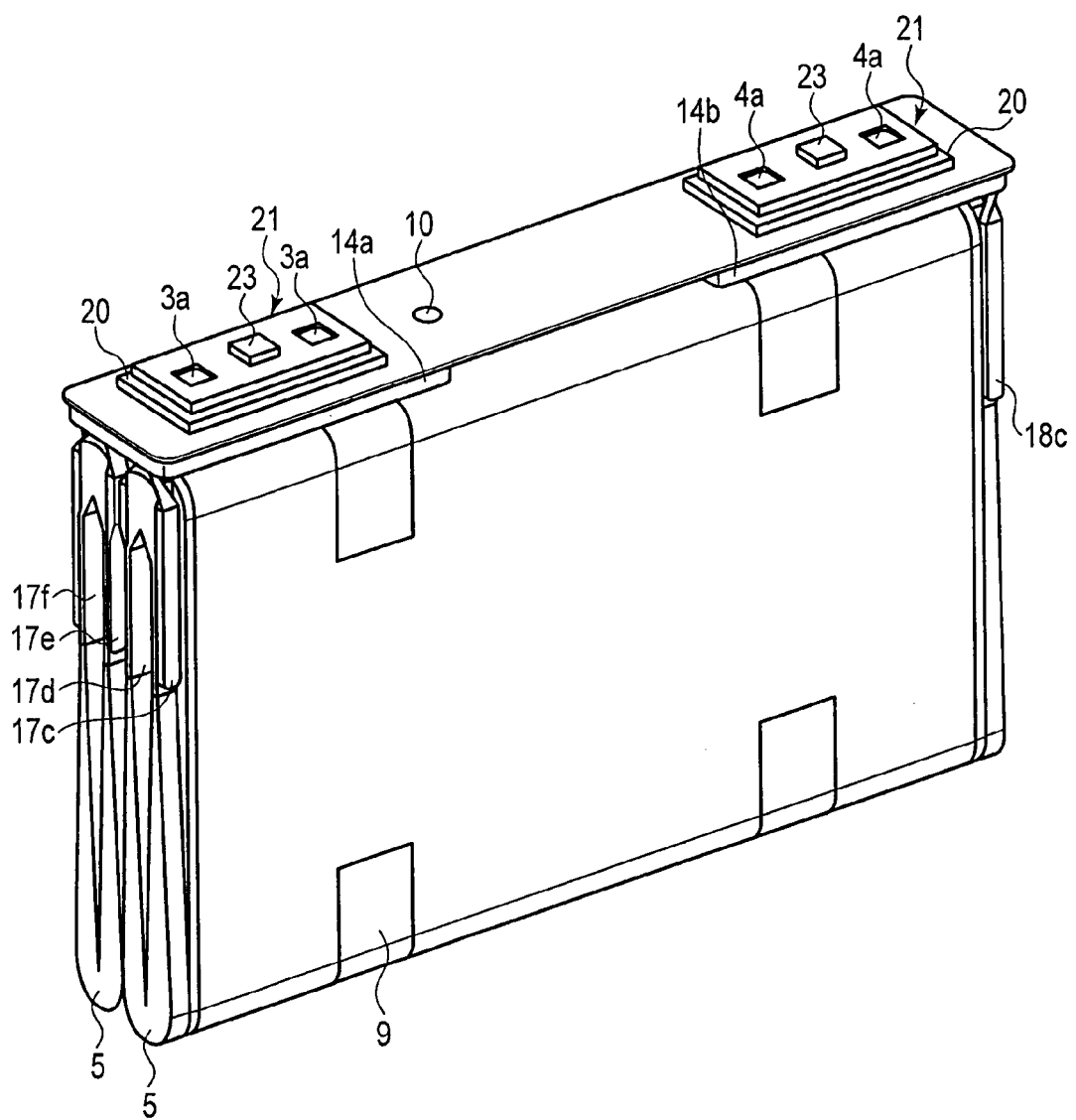
FIG. 8 is a developed perspective view of a battery shown in FIG. 1.

The electrical connection between the electrode group 5 and the positive electrode and negative electrode internal leads 17 and 18 will be explained. FIG. 8 is a perspective view showing the condition where the electrode group 5 is connected to the positive electrode and negative electrode internal leads 17 and 18 disposed on the lid 2. FIG. 9 is a side view obtained when the connection condition shown in FIG. 8 is viewed from the current collecting sections 17c to 17f side of the positive electrode and negative electrode internal lead 17.

As shown in FIGS. 8 and 9, a plurality (for example, 2) of electrode groups 5 is laminated in the direction of the thickness. The electrode length to be wound can be decreased by using the plurality of electrode groups 5 and therefore, the time required to wind up the electrode group 5 can be reduced. Further, because a space formed between the package can and the electrode group can be more reduced than in the case of using one electrode group having the same capacity, the volumetric efficiency of a battery can be improved.

A plurality (for example, 2) of backup leads 50 each has a shape bent almost in a U-shaped form. One backup lead 50 is disposed in each electrode group 5. The backup lead 50 clips the outermost periphery of the positive electrode tab 6a of the electrode group 5 at the part facing the neighboring electrode group and is bonded to the part. The current collecting sections 17c and 17f are each bonded to a position between the bent part and straight part of the outermost periphery of the positive electrode tab 6a of each electrode group 5. Further, the thin wall part of the lower end of the current collecting sections 17d and 17e are each bonded to the backup lead 50.

As shown in FIG. 8, the negative electrode internal lead 18 is bonded to the negative electrode current collecting tab 7a of the electrode group 5 in the same manner as in the case of the positive electrode. Specifically, a plurality (for example, 2) of backup leads 18 each has a shape bent almost in a U-shaped form. One backup lead 50 is disposed in each electrode group 5. The backup lead 50 clips the outermost periphery of the negative electrode current collecting tab 7a of the electrode group 5 at the part facing the neighboring electrode group and is bonded to the part. The current collecting sections 18c and 18f are each bonded to a position between the bent part and straight part of the outermost periphery of the negative electrode current collecting tab 7a of each electrode group 5. Further, the thin wall part of the lower end of the current collecting sections 18d and 18e are each bonded to the backup lead 50.

Examples of a method of bonding the positive electrode and negative electrode internal leads 17 and 18 to the electrode group 5 and backup lead 50 include, though not particularly limited to, ultrasonic welding.

Both end surfaces of the electrode group 5 electrically connected to the positive electrode and negative electrode internal leads 17 and 18 are covered with a spacer 51 produced by resin molding, as shown in FIG. 2. The spacer 51 comprises a first side plate 51a disposed opposite to the end surface of the electrode group 5, a second side plate 51b extended from each long side of the first side plate 51a, and a bottom plate 51c disposed at the lower end of the first side plate 51a and second side plate 51b. The first side plate 51a of the spacer 51 covers the end surface of the electrode group 5 and the current collecting sections 17c to 17f and 18c to 18f of the positive electrode and negative electrode internal leads 17 and 18 disposed on this end surface. The second side plate 51b covers both ends of the outermost periphery of the electrode group 5 and is fixed to the outermost periphery of the electrode group 5 by an insulating tape 9. The bottom plate 51c covers a part of the bottom surface of the outermost periphery of the electrode group 5. When the spacer 51 is used, the electrode group 5 and positive electrode and negative electrode internal leads 17 and 18 can be insulated from the package can 1.

As shown in FIG. 10, the positive electrode and negative electrode external leads 21 are each provided with two rectangular through-holes 22. As shown in FIGS. 5 and 10, the through-hole 22 is constituted of a rectangular cylinder-like through-hole section 22a and spot-faced section 22b disposed on the upper part of the through-hole section 22a. A connecting terminal section 23 made of a convex portion is positioned between the rectangular holes 22 for the external leads 21. The rectangular through-hole 22 is formed at each place corresponding to the head sections 3a and 4a of the positive electrode and negative electrode external terminals 3 and 4. Each top part of the head sections 3a and 4a of the positive electrode and negative electrode external terminals 3 and 4 is fitted in the through-hole section 22a of the external lead 21 and the fitted part is welded (for example, laser welding). It is preferable to take the depth of the spot-faced section 22b into account so carefully that the welded part raised by the welding does not protrude from the upper surface of the external lead 21. When the top part and welded part of each of the positive electrode and negative electrode terminals are so devised that they do not protrude from the upper surface of the external lead, no interference occurs even if a bus bar (for example, a metal plate) used for the connection between batteries used to make a battery assembly has a flat form. The connecting terminal section 23 is used when unit cells constituting a battery assembly are electrically connected with each other. For example, when batteries according to the first embodiment are used as unit cells to constitute a battery assembly, the connecting terminal section 23 of one unit cell can be electrically connected with the connecting terminal section 23 of other unit cell by using a bus bar (not shown). Specifically, the connecting terminal section 23 can be inserted into the through-hole of the bus bar to bond the through-hole of the bus bar to the connecting terminal section 23 by laser welding. Though, in FIGS. 5 and 10, the external form of the convex portion of the connecting terminal section 23 is designed to be rectangular, it is not limited to this rectangular form but may be a circular form or a flat form with no convex portion. Though the connecting terminal section 23 on the external lead 21 is illustrated in FIGS. 1, 2, 4, 5, 8, 9, 10, and 11, the connecting terminal section 23 may be formed with no convex portion but may have a flat form. In this case, a bus bar may be bonded to a desired position on the upper surface of the external lead 21 by, for example, lap welding.

The materials used for the external lead 21, positive electrode and negative electrode internal leads 17 and 18, and backup lead 50 is preferably the same as that of the positive electrode and negative electrode external terminals 3 and 4, though no particular limitation is imposed thereon. When the material of the external terminal is, for example, aluminum or an aluminum alloy, the materials of the external lead, positive electrode and negative electrode internal leads, and backup lead are preferably aluminum or an aluminum alloy. Further, when the external terminal is made of copper, the materials of the external lead, positive electrode and negative electrode internal leads, and backup lead are preferably copper and the like.

In the nonaqueous electrolyte secondary battery of the first embodiment, at least one of the positive electrode external terminal and negative electrode external terminal exists in the plural. For this, when the battery is incorporated into electronic devices and the like or when a battery assembly is constituted of a plurality of batteries, a plurality of external terminals is electrically connected to a counter terminal. Namely, the battery is fixed to the counter terminal by two axes. As a result, the rotation of the external terminal is restricted when external force is applied to the external terminal in a horizontal, vertical, or rotation direction by, for example, oscillation or impact applied to the battery. As shown in, for example, FIG. 1, the positive electrode external lead 21 is connected to a plurality of positive electrode external terminals 3 and the negative electrode external lead 21 is fixed to a plurality of negative electrode external terminals 4. In a battery assembly using two or more of the batteries shown in FIG. 1, the connecting terminal section 23 of the positive electrode and negative electrode external lead 21 of other battery is electrically connected to the connecting terminal section 23 of the positive electrode and negative electrode external lead 21 by a lead or the like. When the battery assembly is used for power sources of electric vehicles, electric tools, or the like, oscillation or impact is applied to the battery assembly and therefore, external force in a horizontal, vertical, or rotation direction is applied to the external terminal of the positive electrode or negative electrode through the external lead 21. Since the plurality of external terminals is fixed to one external lead 21, the rotation of the external terminal can be restricted. As a result, breakages of, for example, the insulating gasket and internal insulating body caused by the rotation of the external terminal are avoided and therefore, deteriorations in air-tightness or insulation can be limited.

If the plurality of external terminals is disposed, current is more distributed to the external terminals in contrast with the case of disposing only one external terminal and therefore, current flowing through the positive electrode and negative electrode terminals at the time of charging, regenerating, or discharging can be limited. For this, Joule heat generated in the positive electrode and negative electrode external terminals can be limited to a lower level and also, the temperature of the insulating gasket fixed to the external terminal by caulking are limited to a low level, so that the deteriorations of air-tightness and insulation can be restricted. Further, the distribution of current to the plurality of external terminals enables the provision of a terminal structure which can provide larger current while keeping air-tightness or insulation.

Moreover, when a plurality of external terminals is fitted up without changing the size of the external terminal, not only the battery of the first embodiment can provide large current while keeping air-tightness and insulation, but also the battery can be produced using conventional equipment ensuring that equipment cost can be reduced.

Second Embodiment

Figure 12:
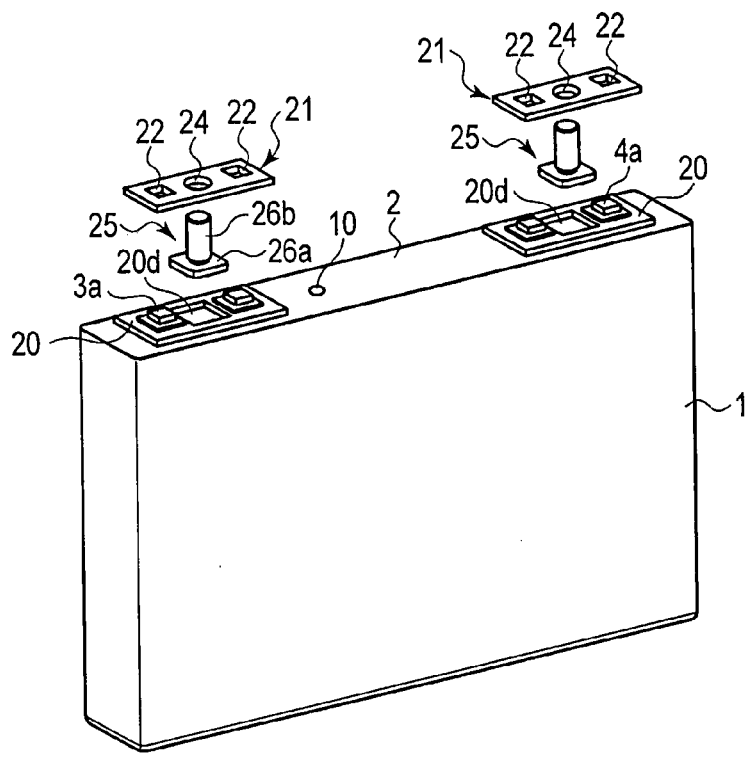
FIG. 12 is a partially exploded perspective view of a battery of a second embodiment.
Figure 13:
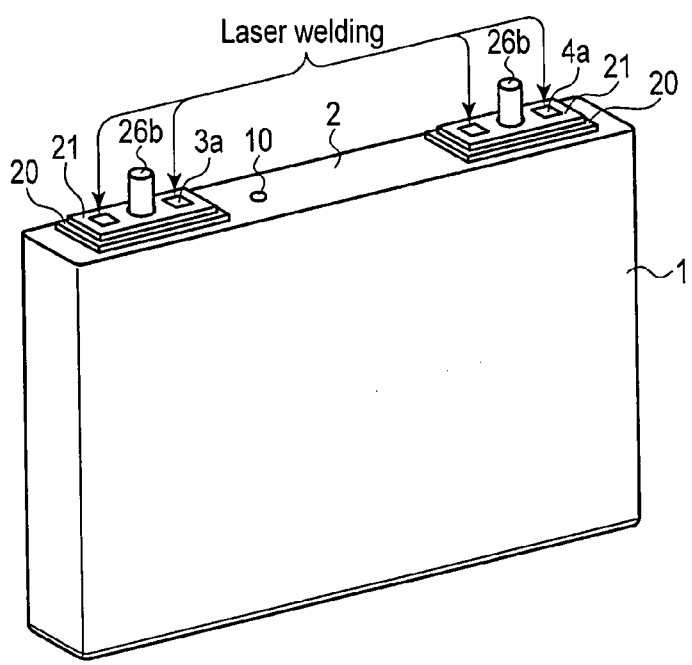
FIG. 13 is a perspective view showing a battery of a second embodiment.

A nonaqueous electrolyte secondary battery according to a second embodiment has the same structure as that of the first embodiment except for the forms of the positive electrode and negative electrode external leads. FIG. 12 is a perspective view showing the condition of a partially exploded nonaqueous electrolyte secondary battery according to the second embodiment and FIG. 13 is a perspective view showing the nonaqueous electrolyte secondary battery according to the second embodiment. In this case, the same members as those explained in the first embodiment are designated by the same signs and explanations of these members are omitted.

As shown in FIG. 12, a circular through-hole 24 is opened in an external lead 21 in place of the connecting terminal section 23. An external insulation body 20 comprises a square concave portion 20d between pedestal sections 20b. A bolt 25 comprises a head section 26a made of a square plate and an axial section 26b extended from the head section 26a. The upper part of the axial section 26b constitutes a screw part, which allows connection with other batteries by screw fixation. The head section 26a of the bolt 25 is fixed to the concave portion 20d of the external insulation body 20. The insulation between the bolt 25 and the lid 2 can be fixed by interposing the external insulation body 20 between the head section 26a of the bolt 25 and the lid 2.

As shown in FIG. 13, the head section 3a of each positive electrode external terminals 3 is inserted into the through-hole 22 of the one external lead 21 and also, the axial section 26b of the bolt 25 is inserted into the through-hole 24 of the one external lead 21. Further, the head section 4a of each negative electrode external terminal 4 is inserted into the through-hole 22 of the another external lead 21 and also, the axial section 26b of the bolt 25 is inserted into the through-hole 24 of the another external lead 21. The head sections 3a and 4a of the positive electrode and negative electrode external terminals 3 and 4 are fixed to the peripheral edge of the through-hole 22 of the external lead 21 by, for example, laser welding.

Examples of the material of the bolt 25 may include an aluminum alloy, copper, iron, and stainless.

According to the second embodiment, the rotation of the external terminal is restricted when external force is applied to the external terminal in a horizontal, vertical, or rotation direction by, for example, oscillation or impact applied to the battery, and also, a large-current performance is improved. Further, when the batteries of the second embodiment are used to make a battery assembly, these batteries can be connected by thread-fastening (fastening with a nut) a metal plate connecting the batteries with the bolt 25. At this time, the external lead 21 is surface-treated by nickel plating, tin-plating, or the like, whereby the electrical contact between the external lead and the metal plate connecting batteries can be improved.

Since the head section 26a of the bolt 25 has a square form, the rotation of the bolt 25 during thread-fastening (fixing with a nut) can be prevented, so that the breakage of the external insulation body 20 or the like due to the rotation of the bolt 25 can be prevented. In FIGS. 12 and 13, the head section 26a of the bolt 25 is designed to have a square form. However, the rotation of the bolt 25 during thread-fastening (fixing with a nut) can be prevented, even if the head section is designed to have a polygonal form (for example, a triangle or tetragonal form), other than a square form.

Figure 14:
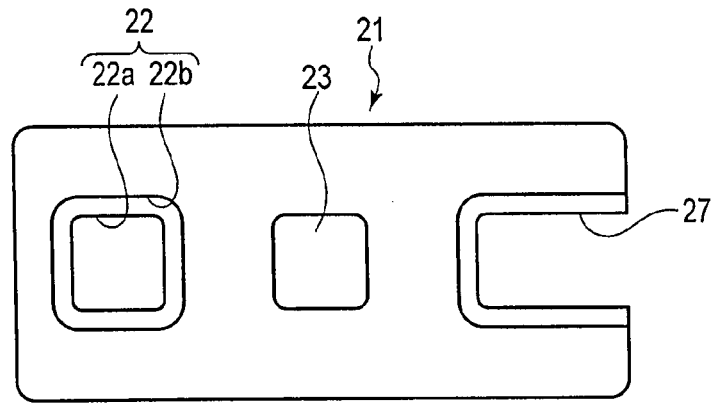
FIG. 14 is a plan view showing another example of an external lead.

Though the head sections 3a and 4a of the positive electrode and negative electrode external terminals 3 and 4 are each inserted into the rectangular through-hole 22 of the external lead 21 in the first and second embodiments, one of the rectangular through-holes 22 may be a slit 27 as shown in FIG. 14. The misregistration of the positive electrode and negative electrode external terminals 3 and 4 can be thereby compensated by the slit 27 of the external lead 21, which makes easy the registration of the positive electrode and negative electrode external terminals 3 and 4 and it is therefore possible to simplify the operation for welding the external lead 21 to the positive electrode and negative electrode external terminals 3 and 4.

Third Embodiment

Figure 15:
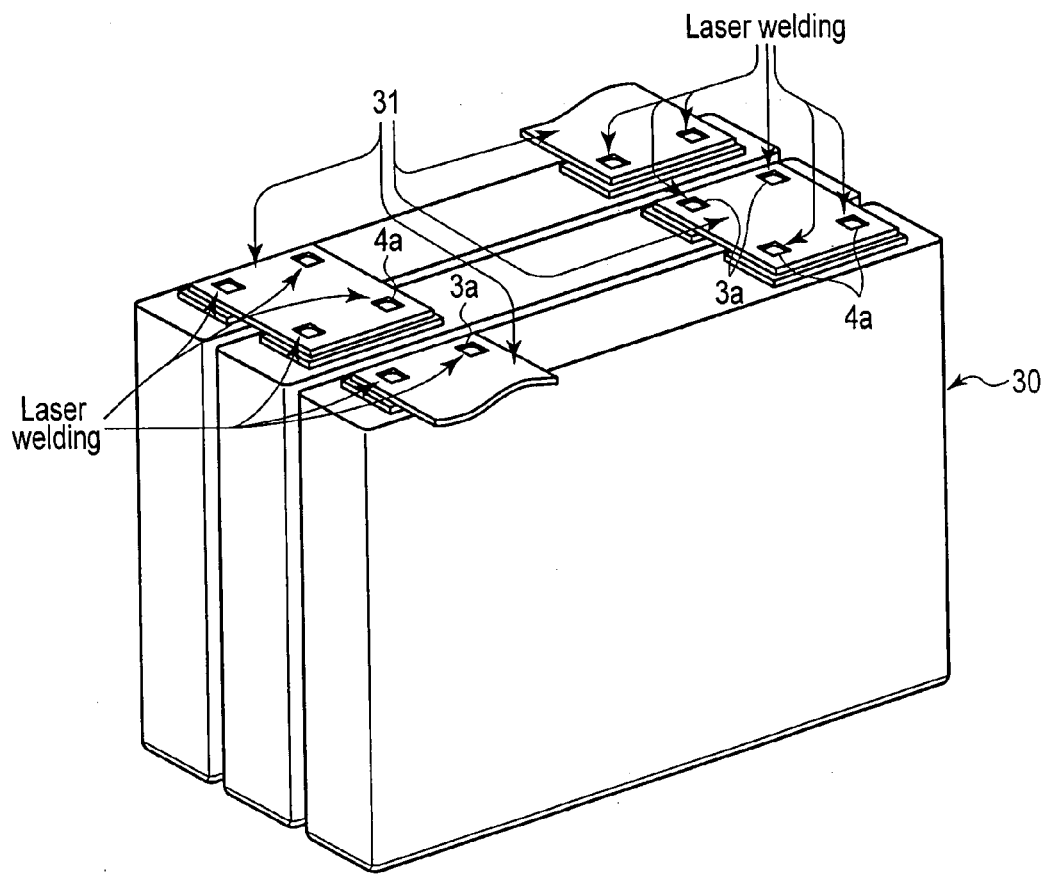
FIG. 15 is a perspective view showing a battery assembly of a third embodiment.

A battery assembly according to a third embodiment comprises two or more (for example, 3) of the batteries of the first or second embodiment as unit cells. As shown in FIG. 15, a battery provided with no external lead 21 (first external lead) is used as a battery 30 of the first or second embodiment. The batteries 30 are arranged in a line and connected in series by using a second external lead 31. The second external lead 31 comprises four rectangular through-holes 22 opened therein. A head section 3a of a positive electrode external terminal 3 of one of the batteries 30 is inserted in each of two rectangular through-holes 22. A head section 4a of a negative electrode external terminal 4 of the battery 30 adjacent to the above battery 30 is inserted in each of the remainder two rectangular through-holes 22. The head sections 3a and 4a of the positive electrode and negative electrode external terminals 3 and 4 are fixed to the peripheral edge of the rectangular through-hole 22 by laser welding.

The battery assembly according to the third embodiment ensures that the rotation of the external terminal is restricted when external force is applied to the external terminal in a horizontal, vertical, or rotation direction by, for example, oscillation or impact applied to the battery assembly, and also, a large-current performance is improved.

Although an example in which unit cells are connected in series is given in FIG. 15, the method of connecting unit cells is not limited to this and, for example, these unit cells may be connected in parallel or a method may be adopted in which a plurality of unit cells is connected in series to form a unit of cells and these units are connected in parallel.

Fourth Embodiment

Figure 16:
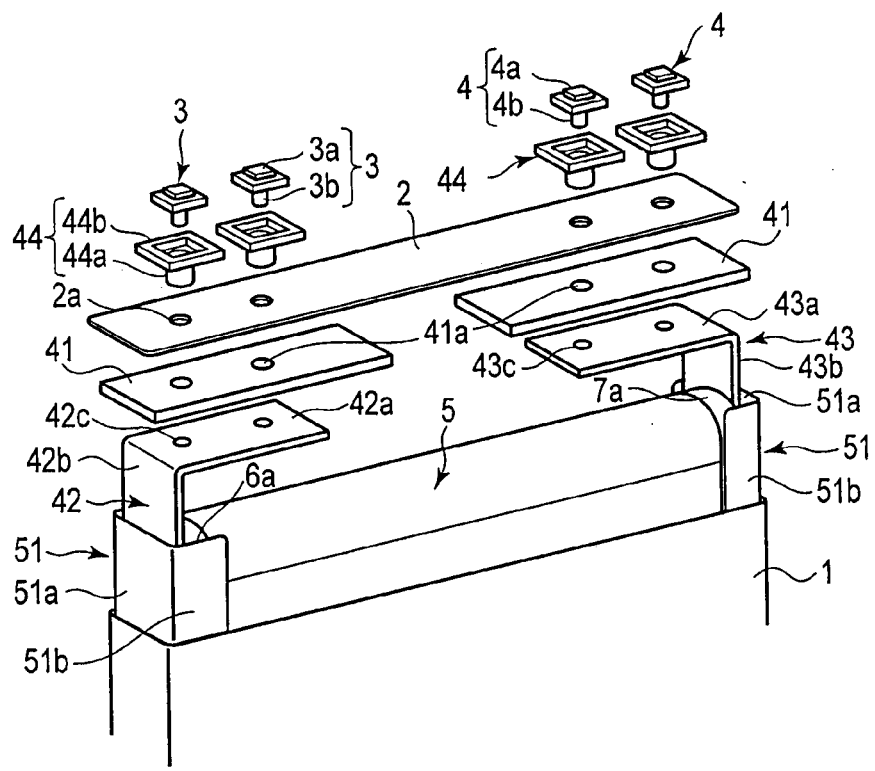
FIG. 16 is a partially exploded perspective view of a battery of a fourth embodiment.
Figure 17:
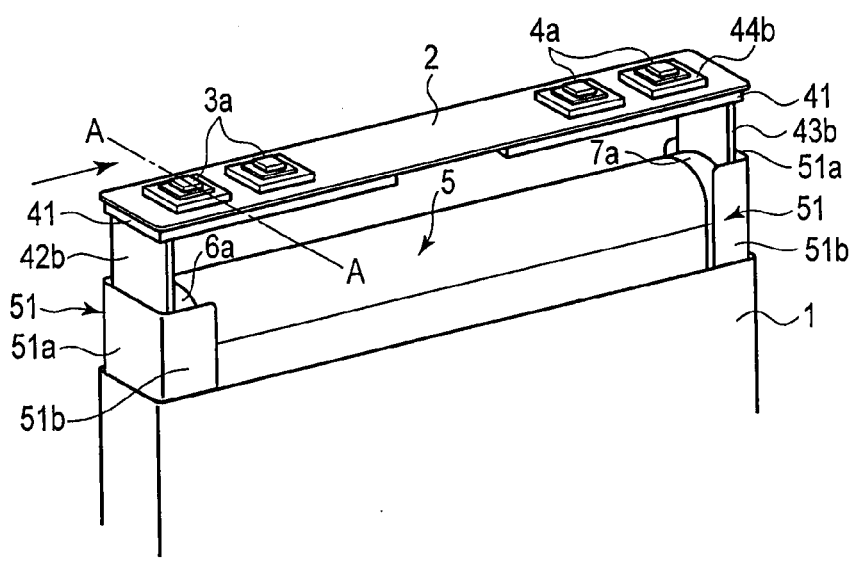
FIG. 17 is a developed perspective view of a battery of a fourth embodiment.

An example of a nonaqueous electrolyte secondary battery according to a fourth embodiment is shown in FIGS. 16 and 17. FIG. 16 is an exploded perspective view of a nonaqueous electrolyte secondary battery of a fourth embodiment, FIG. 17 is a partially exploded perspective view of the battery of the fourth embodiment, and FIG. 18 is an enlarged sectional view of the section along the line A-A. In this case, the same members as those explained with reference to FIGS. 1 to 15 are designated by the same signs and explanations of these members are omitted.

The number of electrode groups 5 accommodated in a package can 1 is one. A liquid nonaqueous electrolyte (not shown) is accommodated in the package can 1. A lid 2 comprises through-holes 2a opened therein corresponding in number to the positive electrode and negative electrode external terminals 3 and 4. For example, in FIG. 16, the number of through-holes 2a is 4. On the backside of the lid 2, an internal insulating body 41 is disposed for each of the positive electrode and negative electrode. Each internal insulating body 41 is formed of a square plate provided with two through-holes 41a opened therein. Positive and negative electrode internal leads 42 and 43 comprise plate sections 42a and 43a and current collecting sections 42b and 43b extended downward from the plate sections 42a and 43a respectively. The plate sections 42a and 43a are each provided with two through-holes 42c and 43c. Four insulating gaskets 44 are each provided with a cylindrical cylinder 44a and a flange section 44b formed like a sword guard at one opening end of the cylinder section 44a.

The cylinder section 44a of the insulating gasket 44 is inserted into each through-hole 2a of the lid 2. The lower end of the cylinder section 44a of each insulating gasket 44 is inserted into the through-hole 41a of the internal insulating body 41. The axial section 3b of the positive electrode external terminal 3 is inserted into the cylinder section 44a of the insulating gasket 44 and though-hole 42c of the positive electrode internal lead 42, is deformed into a form having a broadened diameter by caulking processing and fixed to the lid 2, internal insulating body 41, and plate section 42a of the positive electrode internal lead 42 by caulking. The axial section 4b of the negative electrode external terminal 4 is inserted into the cylinder section 44a of the insulating gasket 44 and though-hole 43c of the negative electrode internal lead 43, is deformed into a form having a broadened diameter by caulking processing and fixed to the lid 2, internal insulating body 41, and plate section 43a of the negative electrode internal lead 43 by caulking. This ensures that the positive electrode and negative electrode external leads 3 and 4 and the lid 2 are fixed under the condition that insulation and airtightness are kept, and further, the positive electrode and negative electrode external terminals 3 and 4 and the positive electrode and negative electrode internal leads 42 and 43 are fixed under the condition that electrical connection is kept. In order to further improve the electrical connection between the axial sections 3b and 4b of the positive electrode and negative electrode external terminals 3 and 4 and the positive electrode and negative electrode internal leads 42 and 43, it is preferable to fix the axial sections 3b and 4b to the peripheral edges of the through-holes of the positive electrode and negative electrode internal leads 42 and 43 by laser welding or the like.

The connections between the positive electrode internal lead 42 and the positive electrode tab 6a and between the negative electrode internal lead 43 and the negative electrode tab 7a are made by, for example, ultrasonic bonding or laser welding.

Both end surfaces of the electrode group 5 electrically connected to the positive electrode and negative electrode internal leads 42 and 43 are covered with a spacer 51 formed of a resin molded product and insulated from a package can 1. A first side plate 51a of the spacer 51 covers the end surface of the electrode group 5 and current collecting sections 42b and 43b of the positive electrode and negative electrode internal leads 42 and 43 disposed on this end surface. A second side plate 51b covers both ends of the outermost periphery of the electrode group 5 and is fixed to the outermost periphery of the electrode group 5 by an insulating tape (not shown). A bottom plate 51*c* (not shown) covers a part of the bottom surface of the outermost periphery of the electrode group 5.

The battery according to the fourth embodiment may comprise the external lead 21 used in the first and second embodiments. Further, a battery assembly may be constituted of the battery according to the fourth embodiment. At this time, the second external lead used in the third embodiment may be used.

According to the fourth embodiment, the rotation of the external terminal is restricted when external force is applied to the external terminal in a horizontal, vertical, or rotation direction by, for example, oscillation or impact applied to the battery, and also, a large-current performance is improved.

Fifth Embodiment

Figure 20:
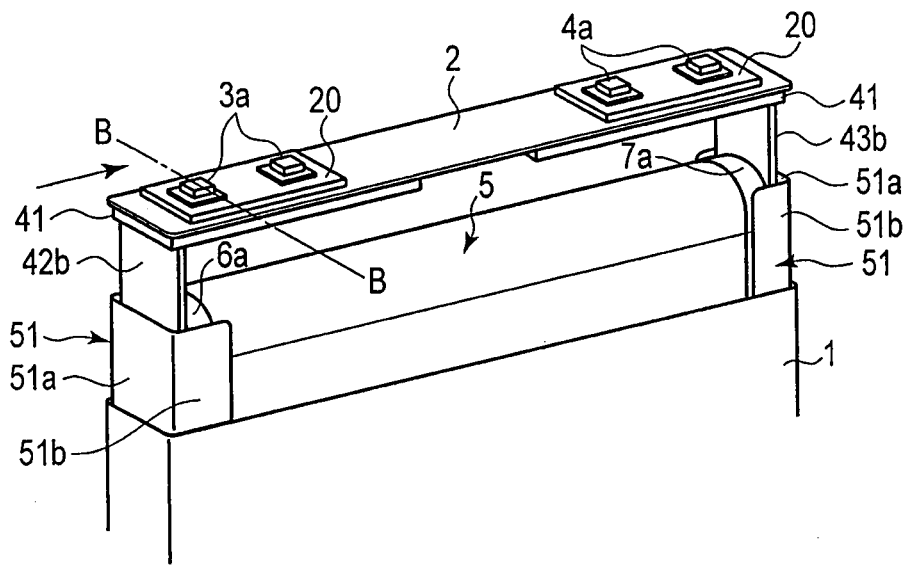
FIG. 20 is a developed perspective view of a battery of a fifth embodiment.
Figure 21:
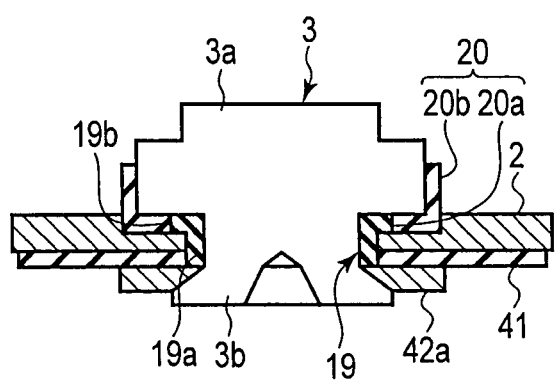
FIG. 21 is an enlarged sectional view of the section along the line B-B of FIG. 20.
Figure 22:
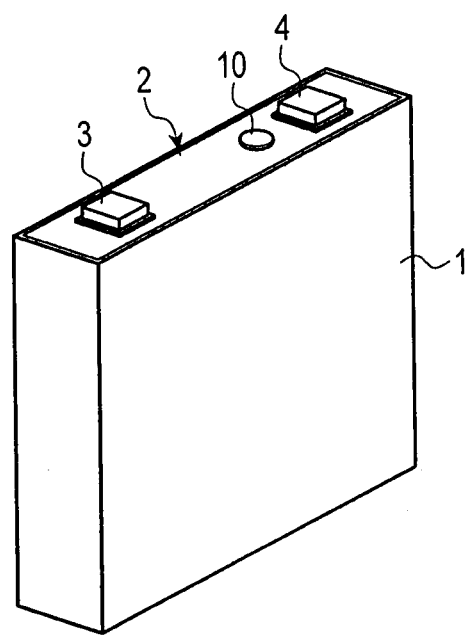
FIG. 22 is a perspective view showing a rectangular type nonaqueous electrolyte secondary battery of Comparative Example 1.

A nonaqueous electrolyte secondary battery according to a fifth embodiment has the same structure as that in the fourth embodiment except that the insulating gasket 19 and the external insulation body 20 explained in the first embodiment are used. FIG. 19 is a partially exploded perspective view of the nonaqueous electrolyte secondary battery according to the fifth embodiment, FIG. 20 is a developed view of the nonaqueous electrolyte secondary battery of a fifth embodiment, and FIG. 21 is an enlarged sectional view of the section along the line B-B. In this case, the same members as those explained with reference to FIGS. 1 to 18 are designated by the same signs and explanations of these members are omitted.

Two external insulation bodies 20 are disposed on the upper surface of a lid 2. Though-holes 20*a* of the external insulation body 20 each correspond to the through-hole 2*a* of the lid 2. The cylinder section 19*a* of the insulating gasket 19 is inserted into the through-hole 2*a* of the lid 2. The lower open end of the cylinder section 19*a* is inserted into the through-hole 41*a* of the internal insulating body 41. A flange section 19*b* of the insulating gasket 19 covers the peripheral edge of the through-hole 2*a* of the lid 2. An axial section 3*b* of positive electrode external terminal 3 is inserted into the cylinder section 19*a* of the insulating gasket 19 and into a though-hole 42*c* of the positive electrode internal lead 42, is deformed into a form having a broadened diameter by caulking processing and fixed to the lid 2, internal insulating body 41, and plate section 42*a* of the positive electrode internal lead 42 by caulking. On the other hand, the axial section 4*b* of the negative electrode external terminal 4 is inserted into the cylinder section 19*a* of the insulating gasket 19 and a through-hole 43*c* of a negative electrode internal lead 43, is deformed into a form having a broadened diameter by caulking, and is fixed to the lid 2, internal insulating body 41, and plate section 43*a* of the negative electrode internal lead 43 by caulking. This ensures that the positive electrode and negative electrode external leads 3 and 4 and the lid 2 are fixed under the condition that insulation and air-tightness are kept, and further, the positive electrode and negative electrode external terminals 3 and 4 and the positive electrode and negative electrode internal leads 42 and 43 are fixed under the condition that electrical connection is kept. In order to further improve the electrical connection between the axial sections 3*b* and 4*b* of the positive electrode and negative electrode external terminals 3 and 4 and the positive electrode and negative electrode internal leads 42 and 43, it is preferable to fix the axial sections 3*b* and 4*b* to the peripheral edges of the through-holes of the positive electrode and negative electrode internal leads 42 and 43 by laser welding or the like.

The connections between the positive electrode internal lead 42 and the positive electrode tab 6*a* and between the negative electrode internal lead 43 and the negative electrode tab 7*a* are made by, for example, ultrasonic bonding or laser welding.

Both end surfaces of the electrode group 5 electrically connected to the positive electrode and negative electrode internal leads 42 and 43 are covered with a spacer 51 formed of a resin molded product and insulated from a package can 1. Specifically, a first side plate 51*a* of the spacer 51 covers the end surface of the electrode group 5 and current collecting sections 42*b* and 43*b* of the positive electrode and negative electrode internal leads 42 and 43 disposed on this end surface. A second side plate 51*b* covers both ends of the outermost periphery of the electrode group 5 and is fixed to the outermost periphery of the electrode group 5 by an insulating tape (not shown). A bottom plate 51*c* (not shown) covers a part of the bottom surface of the outermost periphery of the electrode group 5.

The battery according to the fifth embodiment may comprise the external lead 21 used in the first and second embodiments. Further, a battery assembly may be constituted of the battery according to the fifth embodiment. At this time, the second external lead used in the third embodiment may be used. The insulating gasket 19, external insulation body 20, and internal insulating body 41 are preferably formed from the same materials explained in the first embodiment.

According to the fifth embodiment, the rotation of the external terminal is restricted when external force is applied to the external terminal in a horizontal, vertical, or rotation direction by, for example, oscillation or impact applied to the battery, and also, a large-current performance is improved.

In this case, the external terminals of both the positive electrode and negative electrode are formed plurally. However, when the positive electrode external terminal is formed of aluminum or an aluminum alloy and the negative electrode external terminal is formed of copper, the positive electrode external terminal may be formed plurally whereas the negative electrode external terminal may be formed singly.

Further, the number of positive electrode and negative electrode external terminals is not limited to 2 but may be, for example, 3 or more.

Although the positive electrode and negative electrode external terminal is arranged parallel to the direction of the long side of the lid in FIG. 1, it may be arranged parallel to the direction of the short side of the lid. The positive electrode and negative electrode external terminal is preferably arranged parallel to the direction of the long side of the lid to prevent the rotation of the external terminal.

Although the positive electrode and negative electrode external terminals 3 and 4 are connected to the lid 2 and positive electrode and negative electrode internal leads 17 and 18 by fixation caulking in FIG. 5, fixation using thread fastening (fixing with a nut) may be adopted.

Here, a typical external terminal material will be explained. In the case of a lithium ion secondary battery using a carbon based material as the negative electrode active material, aluminum or an aluminum alloy is generally used for the positive electrode terminal and a metal such as copper, nickel, or iron plated with nickel is used for the negative electrode terminal. Further, when lithium titanate is used as the negative electrode active material, aluminum or an aluminum alloy may be used instead of the above materials for the negative electrode terminal.

Though the electrode group having a flat and spiral shape is used in the embodiments, for example, a laminate type electrode group obtained by laminating a positive electrode and a negative electrode alternately with a separator being interposed therebetween may be used.

A positive electrode, negative electrode, separator, and liquid electrolyte which can be used in the embodiments will be explained.

The positive electrode is manufactured, for example, by applying a slurry containing a positive electrode active material to a current collector made of an aluminum foil or aluminum alloy foil. As the positive electrode active material, oxides, sulfides, and polymers which can absorb and release lithium may be used though any particular limitation is imposed on it. Preferable examples of the positive electrode active material include lithium-manganese complex oxides, lithium-nickel complex oxides, lithium-cobalt complex oxides, and lithium-iron phosphate. Those positive electrode active materials can provide a high positive electrode potential. Further, the negative electrode is produced by applying a slurry containing a negative electrode active material to a current collector made of aluminum or an aluminum alloy foil. As the negative electrode active material, metal oxides, metal sulfides, metal nitrides, and alloys which can absorb and release lithium may be used though no particular limitation is imposed on it, and preferable examples of the negative electrode active material include materials having a lithium ion-absorption/release potential higher by 0.4 V or more than metal lithium potential. Aluminum or an aluminum alloy can be used for a negative electrode current collector and structural members relative to a negative electrode from the reason that the negative electrode active material having such a lithium ion-absorption/release potential restrains the alloy reaction between aluminum or an aluminum alloy and lithium. Examples of the negative electrode active material include titanium oxides, lithium-titanium oxides, tungsten oxides, amorphous tin oxides, tin-silicon oxides, and silicon oxides. Among these oxides, lithium-titanium complex oxides are preferable. As the separator, microporous membranes, woven fabrics, and nonwoven fabrics may be used either singly or as laminates of these materials. Examples of materials used to form the separator may include a polyethylene, polypropylene, ethylene-propylene copolymer, and ethylene-butene copolymer.

As the liquid electrolyte, a nonaqueous liquid electrolyte prepared by dissolving an electrolyte (for example, a lithium salt) in a nonaqueous solvent is used. Examples of the nonaqueous solvent may include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofurane. These nonaqueous solvents may be used either singly or in combinations of two or more. Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethasulfonate ($LiCF_3SO_3$). These electrolytes may be used either singly or in combinations of two or more. The amount of the electrolyte dissolved in the nonaqueous solvent is preferably 0.2 mol/L to 3 mol/L.

Sixth Embodiment

Figure 23:
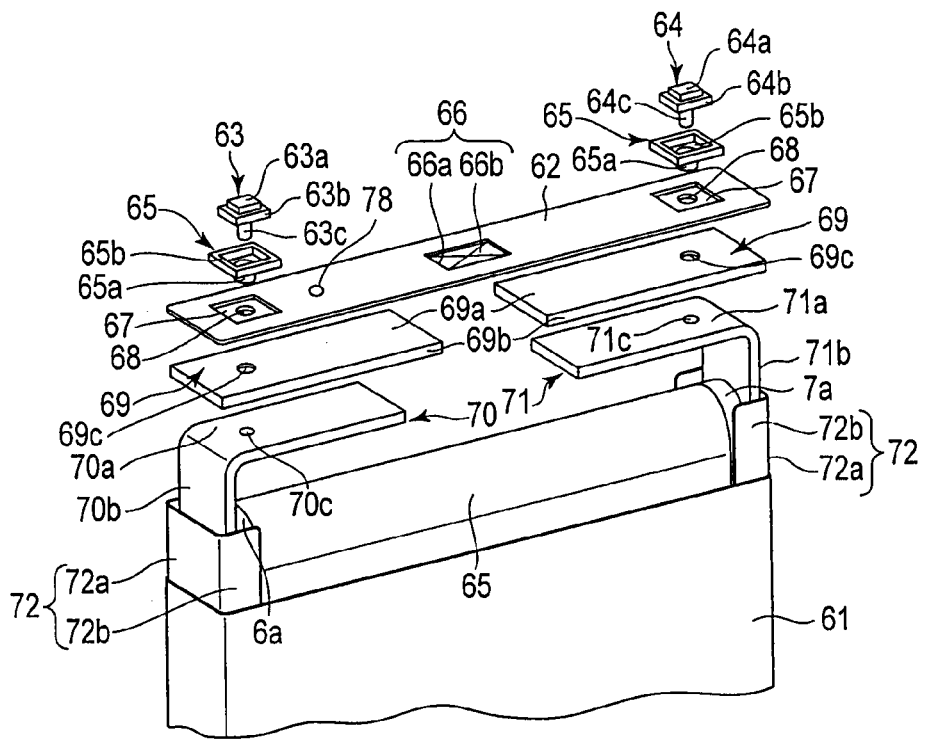
FIG. 23 is a developed view showing the condition of a battery according to a sixth embodiment before terminals are fixed.
Figure 24:
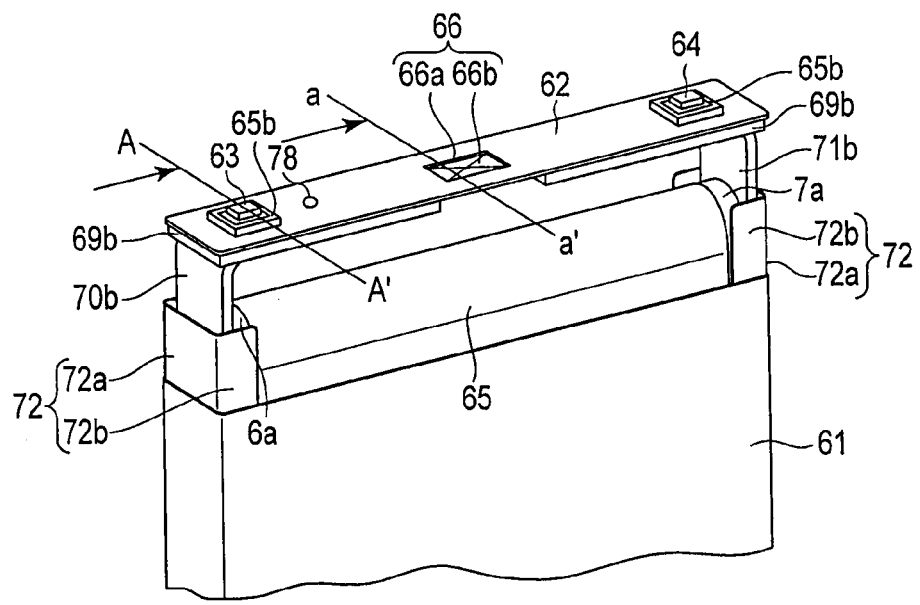
FIG. 24 is a developed view showing the condition of a battery according to a sixth embodiment after terminals are fixed.
Figure 25:
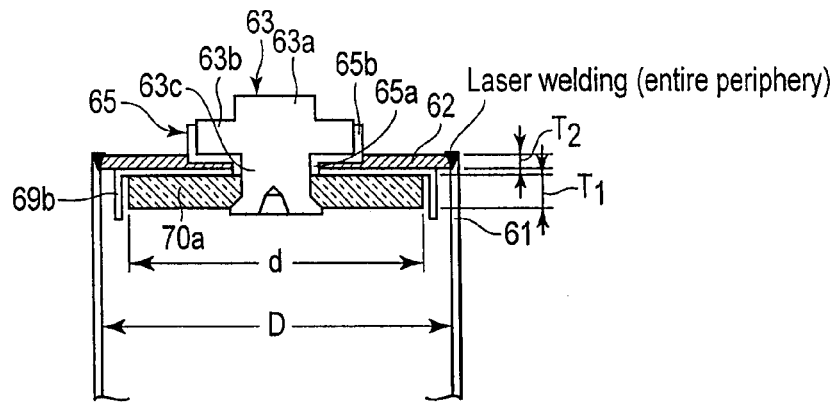
FIG. 25 is a sectional view of the vicinity of external terminals when the vertical section along the line A-A' of FIG. 24 is viewed from the direction of the arrow.
Figure 26:
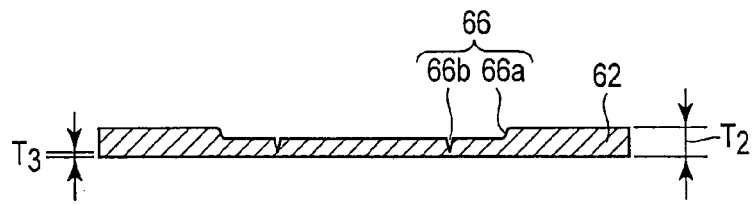
FIG. 26 is a sectional view of a safety valve when the vertical section along the line a-a' of FIG. 24 is viewed from the direction of the arrow.
Figure 27:
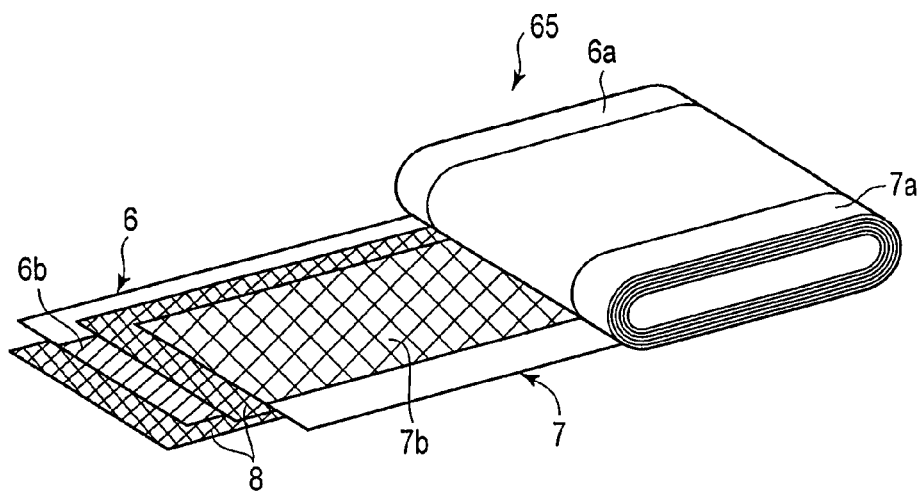
FIG. 27 is a developed perspective view of an electrode group used in a battery shown in FIG. 23.

FIG. 23 is a developed view showing the condition of a battery according to a sixth embodiment before terminals are fixed, FIG. 24 is a developed view showing the condition of a battery according to a sixth embodiment after the terminals are fixed, FIG. 25 is a sectional view of the vicinity of external terminals when a vertical section along the line A-A' of FIG. 24 is viewed from the direction of the arrow, FIG. 26 is a sectional view of a safety valve when a vertical section along the line a-a' of FIG. 24 is viewed from the direction of the arrow, and FIG. 27 is a developed perspective view of an electrode group used in a battery shown in FIG. 23.

The battery illustrated in FIG. 23 is a closed type rectangular nonaqueous electrolyte secondary battery. As shown in FIGS. 23 and 24, the nonaqueous electrolyte secondary battery comprises a package can 61, a lid 62, a positive electrode external terminal 63, a negative electrode external terminal 64, and an electrode group 65.

As shown in FIG. 23, the package can 61 has a bottomed prismatic form and is formed of a metal, for example, aluminum, an aluminum alloy, iron, or stainless.

As shown in FIG. 27, the flat type electrode group 65 is produced by winding a positive electrode 6 and a negative electrode 7 with a separator 8 being interposed therebetween in a flat form. The positive electrode 6 includes a band-shaped positive electrode current collector made of, for example, a metal foil, a positive electrode current collecting tab 6a made of one end part parallel to the long side of the positive electrode current collector, and a positive electrode active material layer 6b formed on the positive electrode current collector excluding at least the part of the positive electrode current collector tab 6a. On the other hand, the negative electrode 7 includes a band-shaped negative electrode current collector made of, for example, a metal foil, a negative electrode current collecting tab 7a made of one end part parallel to the long side of the negative electrode current collector, and a negative electrode active material layer 7b formed on the negative electrode current collector excluding at least the part of the negative electrode current collector tab 7a.

The positive electrode 6, separator 8, and negative electrode 7 like this are wound in such a manner to displace the positive electrode 6 from the negative electrode 7. The positive electrode current collector tab 6a projects from the separator 8 in the direction of the coil axis of the electrode group and the negative electrode current collector tab 7a projects from the separator 8 in the opposite direction. Such a coil structure allows the electrode group 65 to have such a configuration that, as shown in FIG. 27, the spirally wound positive electrode current collector tab 6a projects from one end surface and the spirally wound negative electrode current collector tab 7a projects from the other.

The electrode group 65 is impregnated with a liquid electrolyte (not shown).

As shown in FIG. 25, a rectangular plate lid 62 is seam-welded to an opening portion of the package can 61 by a laser. The lid 62 is formed of a metal, for example, aluminum, aluminum alloy, iron, or stainless. The lid 62 and the package can 61 are desirably formed of the same type of metal. An injection port 78 for the liquid electrolyte is opened in the lid 62 and sealed with a seal lid (not shown) after the liquid electrolyte is injected.

As shown in FIG. 23, a safety valve 66 is disposed in the vicinity of the center of the outer surface of the lid 62. The safety valve 66 comprises, as shown in FIGS. 25 and 26, a rectangular concave portion 66a disposed on the outer surface of the lid 62 and an X-shaped groove section 66b disposed inside of the concave portion 66a. The groove section 66b is formed by press-molding the lid 62 in the direction of the thickness. Because the residual wall thickness $T_3$ of the groove section 66b is lower than the plate thickness $T_2$ of the lid 62, the groove section 66b is broken when the internal pressure of the battery is raised, whereby the internal pressure of the battery is released, making it possible to prevent battery breakage from happening. Because the pressure when the internal pressure is released is defined by the residual wall thickness $T_3$ of the groove section 66b of the safety valve 66, the residual wall thickness $T_3$ is preferably adjusted to a fixed value.

The residual wall thickness $T_3$ may be designed to be generally in a range from 0.01 mm to 0.2 mm though varying depending on the size of the safety valve. In this case, the plate thickness of the lid is preferably in a range from 1 mm to 2 mm.

Figures 28, 29:
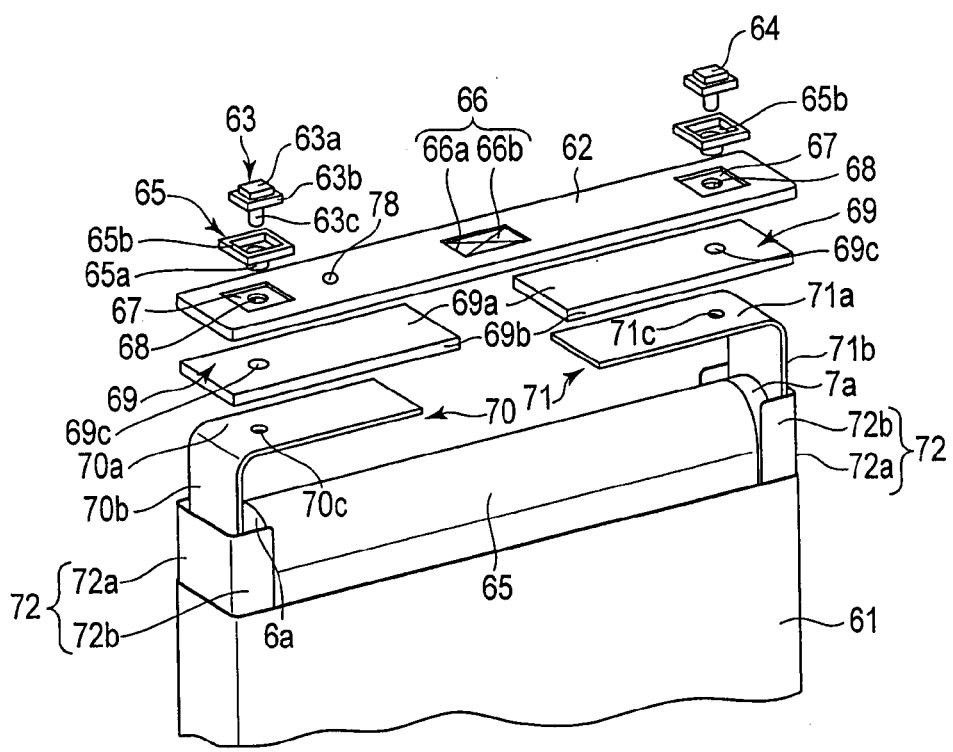
FIG. 28 is a typical view showing another example of a safety valve used in a battery according to a sixth embodiment.
FIG. 29 is a developed view showing the condition of a battery obtained in Comparative Example 2 before terminals are fixed.

The shape of the groove section 66b of the safety valve 66 is not limited to that shown in FIG. 23 but may be a linear form as shown in FIG. 28 (a) or a form in which both ends of a linear part is divided into two branches as shown in FIG. 28 (b).

A rectangular concave portion 67 is formed on both sides between which the safety valve 66 is sandwiched on the outer surface of the lid 62. A positive electrode external terminal 63 is accommodated in one of the concave portions 67 and a negative electrode external terminal 64 is accommodated in other of the concave portions 67. Each concave portion 67 comprises a through-hole 68. The positive electrode external terminal 63 is, as shown in FIGS. 23 and 25, a rectangular head section 63b having a rectangular projection 63a at its top end and an axial section 63c extended downward from the head section 63b. The negative electrode external terminal 64 is, as shown in FIG. 23, a rectangular head section 64b having a rectangular projection 64a at its top end and an axial section 64c extended downward from the head section 64b. In this case, each shape of the projections 63a and 64a and head sections 63b and 64b of the positive electrode and negative electrode external terminals 63 and 64 are not limited to a rectangular shape but may be a circular or polygonal shape. Further, positive electrode and negative electrode external terminals 63 and 64 having no projections 63a and 64a may be used.

In the case of a lithium ion secondary battery using a carbon based material as the negative electrode active material, aluminum or an aluminum alloy is generally used for the positive electrode external terminal 63 and a metal such as copper, nickel, or iron plated with nickel is used for the negative electrode external terminal 64. Further, when lithium titanate is used as the negative electrode active material, aluminum or an aluminum alloy may be used instead of the above materials for the negative electrode external terminal 64.

Internal insulation bodies 69 for positive electrode and negative electrode are respectively disposed on the backside of the lid 62. One internal insulating body 69 is disposed on a position corresponding to the concave portion 67 in which the positive electrode external terminal 63 is to be accommodated whereas another internal insulating body 69 is disposed on a position corresponding to the concave portion 67 in which the negative electrode external terminal 64 is to be accommodated. In this case, a space exists between two internal insulating bodies 69 and the safety valve 66 is disposed opposite to this space. Each internal insulating body 69, as shown in FIGS. 23 and 25, includes a rectangular top board 69a, a side plate 69b extended downward from the peripheral end of the top board 69a, and a through-hole 69c opened in the insulation plate 69a.

A positive electrode internal lead 70 is electrically connected to the positive electrode 6. The positive electrode lead 70 comprises a rectangular support plate 70a, a band-shaped current collecting section 70b extended downward from the short side of the support plate 70a, and a through-hole 70c opened in the support plate 70a. As shown in FIG. 25, the plate thickness $T_1$ of the support plate 70a is higher than the plate thickness $T_2$ of the lid 62. The support plate 70a of the positive electrode lead 70 is accommodated in a concave portion enclosed by the side plate 69b of the internal insulating body 69. The current collection section 70b is bonded with the positive electrode current collecting tab 6a by welding.

A negative electrode internal lead 71 is electrically connected to the negative electrode 7. The negative electrode lead 71 comprises a rectangular support plate 71a, a band-shaped current collecting section 71b extended downward from the short side of the support plate 71a, and a through-hole 71c opened in the support plate 71a. The plate thickness $T_1$ of the support plate 71a is higher than the plate thickness $T_2$ of the lid 62. The support plate 71a of the negative electrode lead 71 is accommodated in a concave portion enclosed by the side plate 69b of the internal insulating body 69. The current collecting portion 71b is bonded with the negative electrode current collecting tab 7a by welding.

The materials of the positive electrode and negative electrode leads 70 and 71 are preferably made to be the same material as those of the positive electrode and negative electrode external terminals 63 and 64. When the material of the external terminal is aluminum or an aluminum alloy, the material of the lead is preferably aluminum or an aluminum alloy. Further, when the external terminal is made of copper, the material of the lead is preferably copper.

Examples of a method for bonding the current collecting sections 70b and 71b of the positive electrode and negative electrode leads 70 and 71 to the positive electrode and negative electrode current collecting tabs 6a and 7a include, though not particularly limited to, ultrasonic welding and laser welding.

The plate thickness of the support plate of the positive electrode lead may be designed to be higher than the plate thickness of the lid, the plate thickness of the support plate of the negative electrode lead may be designed to be higher than the plate thickness of the lid, or the plate thicknesses of the support plates of both the positive electrode and negative electrode leads may be respectively designed to be higher than the plate thickness of the lid. In any case, the pressure when the internal pressure is released can be controlled by the thickness $T_3$ of the residual wall thickness of the groove section 66b of the safety valve 66. Because it is unnecessary to increase the plate thickness $T_2$ of the lid, the pressure when the internal pressure is released can be controlled by a conventional press method. Further, because the strength of the lid section including the lid and the lead fixed to the lids by caulking can be reinforced by making the plate thickness $T_1$ of the support plate of the lead thicker than the plate thickness $T_2$ of the lid, the deformation of the lid can be limited.

The plate thickness $T_1$ of the support plate of each of the positive electrode and negative electrode leads 70 and 71, the plate thickness $T_2$ of the lid 62, and the residual wall thickness $T_3$ of the groove section 66b are measured by, for example, a micrometer.

Insulating gaskets 65 are respectively used to fix the positive electrode external terminal 63 and negative electrode external terminal 64 by caulking. As shown in FIG. 25, the insulating gaskets 65 comprise respectively a cylindrical cylinder 65a and a flange section 65b formed like a sword guard at one opening end of the cylinder section 65a. As shown in FIG. 25, the cylinder section 65a of the insulating gasket 65 is inserted into the through-hole 68 inside of the concave portion 67 of the lid 62, and the lower opening end of the cylinder section 65a is inserted into the through-hole 69c of the internal insulating body 69. The flange section 65b of the insulating gasket 65 covers the peripheral edge of the through-hole 68 inside of the concave portion 67 of the lid 62. The head sections 63b and 64b of the positive electrode and negative electrode external terminals 63 and 64 are respectively accommodated in a space enclosed by the flange section 65b of the insulating gasket 65.

The axial section 63c of the positive electrode external terminal 63 is inserted into the insulating gasket 65 disposed in the through-hole 68 of the lid 62 and through-hole 69c of the internal insulating body 69 and into the through-hole 70c of the support plate 70a of the positive electrode lead 70. The axial section 63c is deformed with a broadened diameter by caulking processing and fixed to the lid 62, internal insulating body 69, and positive electrode lead 70 by caulking. On the other hand, the axial section 64c of the negative electrode external terminal 64 is inserted into the insulating gasket 65 disposed in the through-hole 68 of the lid 62 and through-hole 69c of the internal insulating body 69 and into the through-hole 71c of the support plate 71a of the negative electrode lead 71. The axial section 64c is deformed with a broadened diameter by caulking processing and fixed to the lid 62, internal insulating body 69, and negative electrode lead 71 by caulking. This ensures that the positive electrode and negative electrode external terminals 63 and 64 are fixed to the lid 62 in the condition where insulation and air-tightness are kept and further, the positive electrode and negative electrode external terminals 63 and 64 are fixed to the positive electrode and negative electrode leads 70 and 71 in the condition where electrical connection is secured. In order to further improve the electrical connection between the axial sections 63c and 64c of the positive electrode and negative electrode external terminals 63 and 64 and the positive electrode and negative electrode leads 70 and 71, the axial sections 63c and 64c are preferably fixed to the peripheral edge of the through-hole of the positive electrode and negative electrode leads 70 and 71.

Both the insulating gasket 65 and the internal insulating body 69 are preferably resin molded products. As the insulating gasket 65, a molded product produced using a resin material having a higher melting point than the internal insulating body 69 is preferably used so that air-tightness by fixation caulking can be secured. Air-tightness at high temperatures (for example, 100° C. or less) can be thereby secured.

The resin material used for the insulating gasket 65 and having a high melting point is preferably a fluororesin molded product superior in resistance to a liquid electrolyte and specific examples of the resin may include a tetrafluoroethylene-perfluoroalkyl vinyl ether copolymer (hereinafter referred to as PFA) having a melting point of 300 to 310° C.

PFA preferably has a melt flow rate (hereinafter referred to as MFR) of 5 g/10 min or less. This restrains the flow of the resin at high temperature, so that air-tightness is improved. MFR is measured under the condition of a temperature of 372° C. and a load of 5 kg.

If the resin used for the internal insulating body 69 can be injection-molded, the degree of freedom of variations in shape is increased though there is no particular limitation to the resin. Specific examples of the resin include a polypropylene (PP), polyethylene terephthalate (PET), and polyphenylene sulfide (PPS).

Both end surfaces of the electrode group 65 electrically connected to the positive electrode and negative electrode leads 70 and 71 are covered with a spacer 72 made of a resin molded product and the electrode group 65 is insulated from the package can 61. Specifically, a first side plate 72a of the spacer 72 covers the current collecting sections 70b and 71b of the positive electrode and negative electrode leads 70 and 71 disposed on the end surface of the electrode group 65. A second side plate 72b covers the outermost periphery of both ends of the electrode group 65 and is fixed to the outermost periphery of the electrode group 65 by an insulating tape (not shown). A bottom plate (not shown) covers a part of the bottom surface at the outermost periphery of the electrode group 65. The use of the spacer 72 enables the electrode group 65 and positive electrode and negative electrode leads 70 and 71 to be insulated from a package can 61.

When a battery is large-sized, the lid and package can are also large-sized. Many nonaqueous electrolyte secondary batteries, when they are used, comprise a safety valve on the assumption that there is the case where the battery is put into a overcharged state by, for example, troubles of a charge device or protective functions or the case where the battery is put into the state where an external short circuit is developed, leading to increased internal pressure of the battery. The function of safely releasing the internal pressure of the battery to thereby prevent the battery from breaking can be thereby expected.

Many safety valves are disposed on the lid. If a safety valve is attached by, for example, welding, this increases parts and leads to cost-up because it costs to carry out a welding process. It is therefore required to provide a safety valve function to the lid by integral molding. When a safety valve is integrated with the lid by molding, a groove is formed by press-molding in the direction of the plate thickness and the plate thickness (hereinafter referred to as residual wall thickness) of the groove section is reduced to provide a safety valve function to the lid.

When a battery is large-sized, a lid is large-sized, and along with this, parts integrated with the lid are large-sized. The plate thickness of the lid tends to be higher to secure the strength of the lid section including the lid and the parts to be integrated with the lid. When the plate thickness of the lid is increased, it is difficult to integrate the safety valve with the lid and further, variation in the residual wall thickness of the groove of the safety valve is increased. The variation in the residual wall thickness of the groove of the safety valve leads to variation in the release pressure of the safety valve, and therefore, the safety valve cannot be released at a predetermined internal pressure when the internal pressure of the battery is increased.

Figure 30:
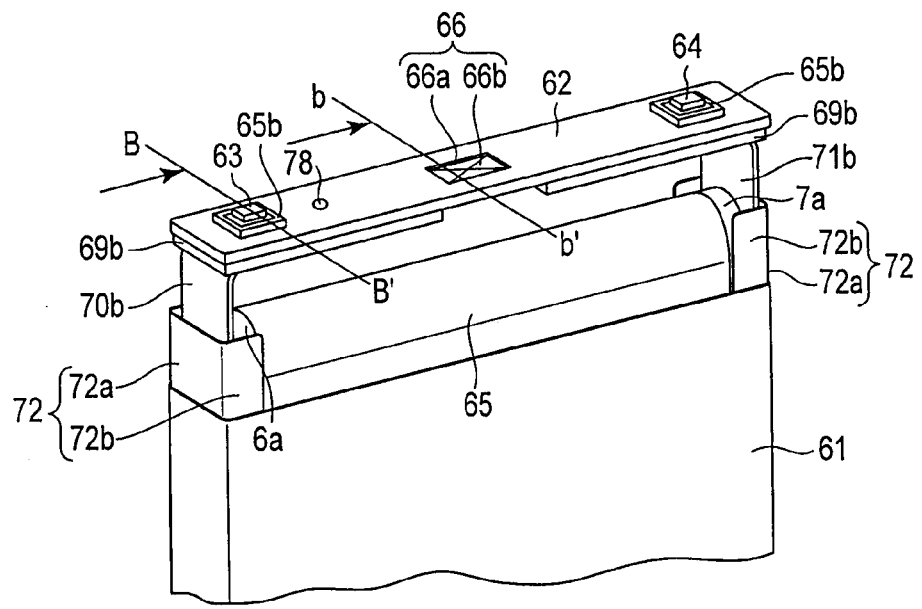
FIG. 30 is a developed view showing the condition of a battery obtained in Comparative Example 2 after terminals are fixed.
Figure 31:
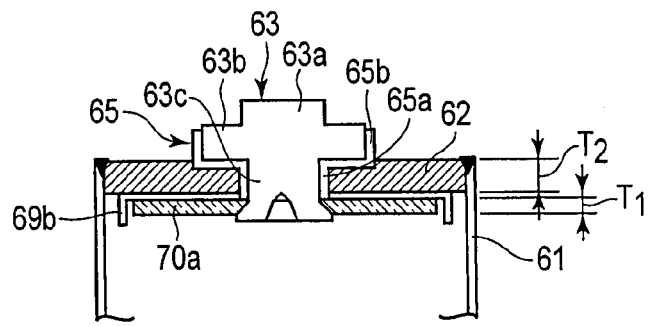
FIG. 31 is a sectional view of the vicinity of external terminals when the vertical section along the line B-B' of FIG. 30 is viewed from the direction of the arrow.
Figure 32:
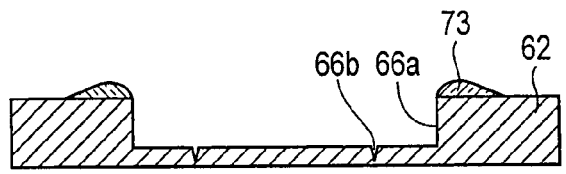
FIG. 32 is a sectional view of a safety valve when the vertical section along the line b-b' of FIG. 30 is viewed from the direction of the arrow.

When the lid is large-sized along with increase in battery size, the lid is easily deformed when external force such as impact is applied to the lid. This causes deterioration in the air-tightness of the part where the lid and external terminal are fixed, bringing about such a thought that it causes the deterioration of battery performance. As example of a method of securing the strength of the lid, a method in which the plate thickness of the lid is increased is given and a nonaqueous electrolyte battery of Comparative Example 2 is shown in FIGS. 29 to 32. FIG. 29 is a developed view showing the condition of a battery obtained in Comparative Example 2 before terminals are fixed, FIG. 30 is a developed view showing the condition of a battery obtained in Comparative Example 2 after the terminals are fixed, FIG. 31 is a sectional view of the vicinity of external terminals when a vertical section along the line B-B' of FIG. 30 is viewed from the direction of the arrow, and FIG. 32 is a sectional view of a safety valve when the vertical section along the line b-b' of FIG. 30 is viewed from the direction of the arrow. In FIGS. 29 to 32, the same members as those shown in FIG. 23 are designated by the same signs and explanations of these members are omitted. Because the pressure when the internal pressure is released is defined by the residual wall thickness $T_3$ of a groove 66b of a safety valve 66, it is difficult to adjust the groove section 66b of the safety valve 66 to a fixed thickness if the plate thickness $T_2$ of the lid 62 is increased. For this, the battery of Comparative Example 2 is varied in the working pressure of the safety valve 66. Further, when the groove section 66b of the safety valve 66 is press-molded, it is necessary to adjust a predetermined plate thickness from a higher thickness. Therefore, a rise part 73 is easily formed on a part other than the groove section 66b by a surplus material, so that irregularities on the upper surface of the lid is enlarged, resulting in shape inferiors.

The nonaqueous electrolyte battery of the sixth embodiment comprises the positive electrode lead electrically connected to the positive electrode and negative electrode lead electrically connected to the negative electrode. At least one of the positive electrode and negative electrode leads includes a support plate having a higher plate thickness than the lid. When the external terminal is integrated with the lid and the support plate by, for example, fixation caulking, the support plate can reinforce the lid from the backside because the support plate is disposed along the backside of the lid. This assures that even if the plate thickness of the lid is low, the strength of the lid part including the lid and support plate can be secured. Moreover, because the thickness of the residual wall thickness of the groove section of the safety valve can be easily adjusted to a fixed value by reducing the plate thickness of the lid, the pressure when the internal pressure of the safety valve is released is stabilized. Further, because the surplus of material is reduced when the groove of the safety valve is press-molded, the irregularities of the upper surface of the lid can be reduced.

When the external terminal is fixed to the lid and support plate by caulking, the support plate is, as illustrated in FIG. 23, disposed on the backside of the lid by interposing an insulation member such as an internal insulating body between the backside of the lid and the support plate. Or, the support plate is disposed directly on the backside of the lid. Because the support body is disposed along the backside of the lid, the lid part can be reinforced by the support body.

Further, when the positive electrode lead or the negative electrode lead satisfies the requirement of the following (1), the strength of the lid part can be improved. Particularly, when both the positive electrode lead and negative electrode lead satisfy the requirement of the following (1), the strength of the lid part can be more improved. The upper limit of d/D is 1.

$$d/D \geq 2/3 \quad (1)$$

In the equation (1), d is the length of the support plate in a direction parallel to the thickness of the battery and D is the length of the internal dimension of the package can in a direction parallel to the thickness of the battery. In the case of a bottomed rectangular cylindrical package can, the length of the battery in the direction of the thickness is a length of the battery in a direction parallel to the direction of the short side of the package can.

According to the sixth embodiment, as explained above, the plate thickness of the support plate of at least one of the positive electrode and negative electrode leads is larger than that of the lid and therefore, a battery provided with a safety valve having stable release pressure while keeping the strength of the lid part can be attained at low cost.

The structure of the lead is not limited to that of the sixth embodiment, and for example, a lead illustrated in the following seventh embodiment may be used.

Seventh Embodiment

Figure 34:
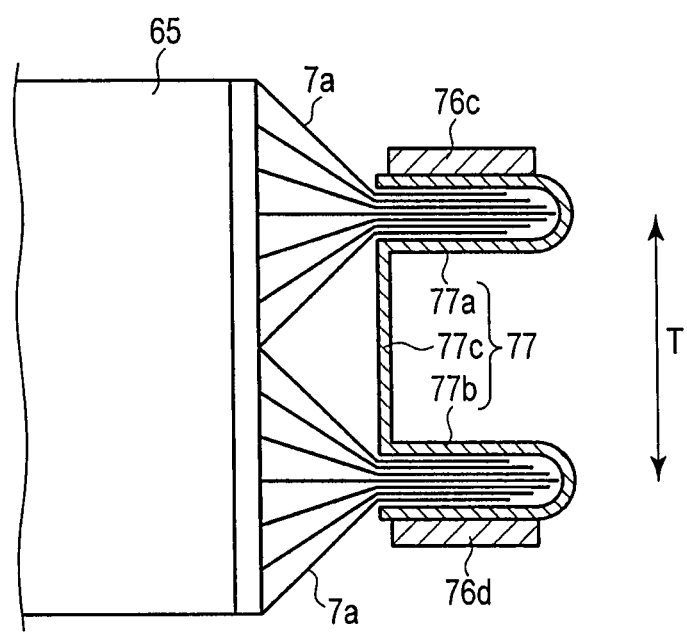
FIG. 34 is an enlarged sectional view when the section along the line C-C of FIG. 33 is viewed from the direction of the arrow.

FIG. 33 is a developed perspective view showing a rectangular type battery of a seventh embodiment and FIG. 34 is an enlarged sectional view when the section along the line C-C of FIG. 33 is viewed from the direction of the arrow. In this case, the same members as those explained with reference to FIGS. 23 to 32 are designated by the same signs and explanations of these members are omitted.

A battery 74 shown in FIG. 33 is a closed and rectangular type nonaqueous electrolyte secondary battery. The battery 74 comprises a package can 61, a flat type electrode group 65 accommodated in the package can 61, positive electrode and negative electrode internal leads 75 and 76 positioned in the package can 61, a lid 62 attached to an opening part of the package can 61, and positive electrode and negative electrode external terminals 63 and 64 and a safety valve 66 disposed on the lid 62. A liquid electrolyte (not shown) is contained in the package can 61 and the flat type electrode group 65 is impregnated with the liquid electrolyte.

As shown in FIGS. 33 and 34, a positive electrode current collector tab 6a and a negative electrode current collector tab 7a are each divided into two bundles laminated in the direction of thickness (shown by T in FIG. 34) of the electrode group. A conductive holding member 77 comprises an almost U-shaped first and second holding sections 77a and 77b and a connecting section 77c electrically connecting the first holding section 77a with the second holding section 77b.

As shown in FIG. 33, the positive electrode lead 75 comprises a support plate 75a having an almost rectangular form, a through-hole 75b opened in the support plate 75a, and strip-like current collecting sections 75c and 75d which are divided into two branches and extended downward from the support plate 75a. On the other hand, the negative electrode lead 76 comprises a support plate 76a having an almost rectangular form, a through-hole 76b opened in the support plate 76a, and strip-like current collecting sections 76c and 76d which are divided into two branches and extended downward from the support plate 76a. The support plates 75a and 76a of the positive electrode and negative electrode leads 75 and 76 may have a structure in which one or both of them have a plate thickness larger than the lid 62.

The negative electrode lead 76 has a structure in which a holding member 77 is sandwiched between the current collecting sections 76c and 76d as shown in FIGS. 33 and 34. The current collecting section 76c is disposed on the first holding section 77a of the holding member 77. On the other hand, the current collecting section 76d is disposed on the second holding section 77b. The current collecting sections 76c and 76d are bonded to the first and second holding sections 77a and 77b and the negative electrode current collecting tab 7a by, for example, ultrasonic welding. The negative electrode 7 of the electrode group 65 is thereby electrically connected to the negative electrode lead 76 through the negative electrode current collecting tab 7a.

The positive electrode lead 75 has a structure in which, like the case of the negative electrode lead 76, a holding member 77 is sandwiched between the current collecting sections 75c and 75d. The current collecting section 75c is disposed on a first holding section 77a of the holding member 77. On the other hand, the current collecting section 75d is disposed on a second holding section 77b. The current collecting sections 75c and 75d are bonded to the first and second holding sections 77a and 77b and the positive electrode current collecting tab 6a by, for example, ultrasonic welding. The positive electrode 6 of the electrode group 65 is thereby electrically connected to the positive electrode lead 75 through the positive electrode current collecting tab 6a.

Although no particular limitation is imposed on the materials of the positive electrode and negative electrode leads 75 and 76 and holding member 77, it is preferable to use the same materials as the positive electrode and negative electrode external terminals 63 and 64. When, for example, the material of the external terminal is aluminum or an aluminum alloy, the material of the lead is preferably aluminum or an aluminum alloy. Further, when the external terminal is made of copper, the material of the lead is preferably copper.

Both ends of the electrode group 65 electrically connected to the positive electrode and negative electrode leads 75 and 76 are covered with a spacer 72 made of a resin molded product and therefore, the electrode group 65 is insulated from the package can 61. The spacer 72 comprises a first side plate 72a, a second side plate 72b, a bottom plate 72c, and a plurality of projected sections 72d. The first side plate 72a covers the end surface of the outermost periphery of the electrode group 65. The second side plate 72b and the bottom plate 72c cover the vicinity of the end of the outermost periphery of the electrode group 65. The projected section 72d is disposed on three positions apart from each other on the first side plate 72a.

On the positive electrode current collecting tab 6a side, the part where the positive electrode current collecting tab 6a, first holding section 77a, and current collection section 75c of the positive electrode lead are bonded by, for example, ultrasonic welding and the part where the positive electrode current collecting tab 6a, second holding section 77b, and current collection section 75d of the positive electrode lead are bonded by, for example, ultrasonic welding are respectively inserted into a space between the projected sections 72d.

On the negative electrode current collecting tab 7a side, the part where the negative electrode current collecting tab 7a, first holding section 77a, and current collection section 76c of the negative electrode lead are bonded by, for example, ultrasonic welding and the part where the negative electrode current collecting tab 7a, second holding section 77b, and current collection section 76d of the negative electrode lead are bonded by, for example, ultrasonic welding are respectively inserted into a space between the projected sections 72d.

The support plates 75a and 76a of the positive electrode and negative electrode leads 75 and 76 are accommodated in a concave portion enclosed by the side plate 69b of the internal insulating body 69.

As the positive electrode and negative electrode external terminals 63 and 64, as shown in FIG. 33, those having no projections 63a and 64a are used. Head sections 63b and 64b of the positive electrode and negative electrode external terminals 63 and 64 are accommodated in a space enclosed by a flange section 65b of an insulating gasket 65. The axial sections 63c and 64c of the positive electrode and negative electrode external terminals 63 and 64 are attached to a through-hole 68 of the lid 62, a through hole 69c of the internal insulating body 69, and the through-holes 75b and 76b of the positive electrode and negative electrode leads 75 and 76 by fixation caulking with interposing the insulating gasket 65 therebetween.

According to the seventh embodiment mentioned above, the plate thickness of the support plate of at least one of the positive electrode and negative electrode leads is larger than that of the lid and therefore, a battery comprising a safety valve having stable release pressure while keeping the strength of the lid part can be attained at low cost.

The positive electrode, negative electrode, separator, and liquid electrolyte which can be used in the sixth and seventh embodiments will be explained.

The positive electrode is manufactured, for example, by applying a slurry containing a positive electrode active material to a current collector made of an aluminum foil or aluminum alloy foil. As the positive electrode active material, oxides, sulfides, and polymers which can absorb and release lithium may be used though any particular limitation is imposed on it. Preferable examples of the active material include lithium-manganese complex oxides, lithium-nickel complex oxides, lithium-cobalt complex oxides, and lithium-iron phosphate, which can provide a high positive electrode potential. Further, the negative electrode is produced by applying a slurry containing a negative electrode active material to a current collector made of aluminum foil or an aluminum alloy foil. As the negative electrode active material, metal oxides, metal sulfides, metal nitrides, and alloys which can absorb and release lithium may be used though no particular limitation is imposed on the negative electrode active material, and preferable examples of the negative electrode active material include materials having a lithium ion-absorption/release potential higher by 0.4 V or more than metal lithium potential. Aluminum or an aluminum alloy can be used for a negative electrode current collector and structural members relative to a negative electrode from the reason that the negative electrode active material having such a lithium ion-absorption/release potential restrains the alloy reaction between aluminum or an aluminum alloy and lithium. Examples of the negative electrode active material include titanium oxides, lithium-titanium oxides, tungsten oxides, amorphous tin oxides, tin-silicon oxides, and silicon oxides. Among these oxides, lithium-titanium complex oxides are preferable. As the separator, microporous membranes, woven fabrics, and nonwoven fabrics may be used either singly or as laminates of these materials. Examples of materials used to form the separator may include a polyethylene, polypropylene, ethylene-propylene copolymer, and ethylene-butene copolymer.

As the liquid electrolyte, a nonaqueous liquid electrolyte prepared by dissolving an electrolyte (for example, a lithium salt) in a nonaqueous solvent is used. Examples of the nonaqueous solvent may include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofurane. These nonaqueous solvents may be used either singly or in combinations of two or more. Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethasulfonate ($LiCF_3SO_3$). These electrolytes may be used either singly or in combinations of two or more. The amount of the electrolyte dissolved in the nonaqueous solvent is preferably 0.2 mol/L to 3 mol/L.

In the embodiments, a nonaqueous electrolyte secondary battery is adopted as the type of battery. However, the present invention is not limited to this type of battery and the present invention may be applied to an alkali secondary battery. As to the shape of the battery, the present invention is not limited to a rectangular type described in the embodiments but may be applied to, for example, a cylindrical type. Although a flat and spiral electrode group is used in the embodiments, there is no particular limitation to the structure of the electrode group in the embodiments and for example, a laminate type electrode group obtained by laminating a positive electrode and a negative electrode alternately with a separator being interposed therebetween may be used. The number of electrode groups may be one or two or more. There is no particular limitation to the number of positive electrode and negative electrode external terminals and the positive electrode and negative electrode external terminals may be used singularly or plurally. The numbers of positive electrode and negative electrode external terminals are not required to be the same, but such a structure may be adopted in which one of these positive electrode and negative electrode external terminals exists singularly and other exists plurally. Although the positive electrode and negative electrode external terminals are connected to the lid and positive electrode and negative electrode leads by fixation caulking in the embodiments, they may be fixed by thread fastening (fastening with a nut).

EXAMPLES

Examples of the present invention will be explained in detail.

Example 1

A rectangular-type nonaqueous electrolyte secondary battery having the structure shown in FIG. 1 was prepared. As the positive electrode, a sheet-like material was used which was prepared by forming an active material-containing layer containing lithium-cobalt oxide ($LiCoO_2$), a graphite powder as a conductive agent, and a polyvinylidene fluoride (PVdF) as a binder on each side of a current collector constituted of an aluminum or aluminum alloy foil. As the negative electrode, on the other hand, a sheet-like material was used which was prepared by forming an active material-containing layer containing a negative electrode active material powder having a lithium absorption potential of 0.4 V or more in terms of open circuit potential based on the open circuit potential of a lithium metal, a carbon powder as a conductive agent, and a polyvinylidene fluoride (PVdF) as a binder on each side of a current collector constituted of an aluminum or aluminum alloy foil. As the electrode group 5, an electrode group was used which was produced by spirally winding the positive electrode and negative electrode with a separator being interposed therebetween and then pressing the whole body into a sectionally square form according to the sectional shape of a battery can.

As a battery of an example shown in FIG. 1, an aluminum alloy was used for a package can 1, a lid 2, positive electrode and negative electrode external terminals 3 and 4, positive electrode and negative electrode internal leads 17 and 18, an external lead 21, and a backup lead 50. Further, PP was used for resin materials of an external insulation body 20 and internal insulating body 13 and PFA (trademark: AP-230, manufactured by Daikin Industries, Ltd.) having a MFR of 2 g/10 min was used as an insulating gasket 19. The battery of this example was subjected to a test to examine whether or not the connecting terminal section 23 of the external lead 21 connected to each of the positive electrode and negative electrode external terminals 3 and 4 was rotated when rotating force was applied to the connecting terminal section 23, and it was found that any of the positive electrode and negative electrode external terminals 3 and 4 was not rotated under a torque of 5 Nm. Further, electric current was made to flow across the positive electrode connecting terminal section 23 of the external lead 21 connected to the positive electrode external terminal 3 and the negative electrode connecting terminal section 23 of the external lead 21 connected to the negative electrode external terminal 4 in the following condition to measure the temperatures of the head sections 3a and 4a of the positive electrode and negative electrode external terminals 3 and 4, to obtain the following test results.

Energizing condition: circumferential temperature: 25° C., battery: in a half-charged state (SOC 50%). The battery was continuously energized by repeating charge/discharge every 10 sec. in the condition of a charge current of 200 A and a discharge current of 200 A.

Two positive electrode external terminals 3 are named a positive electrode external terminal (outside) and a positive electrode external terminal (inside) from the left side of FIG. 1, and two negative electrode external terminals 4 are named a negative electrode external terminal (inside) and a negative electrode external terminal (outside) from the left side of FIG. 1. After the continuous energization was continued for 30 min, the temperature of the top of the head section of the positive electrode external terminal (outside) was 50° C., the temperature of the top of the head section of the positive electrode external terminal (inside) was 48° C., the temperature of the top of the head section of the negative electrode external terminal (inside) was 47° C., and the temperature of the top of the head section of the negative electrode external terminal (outside) was 49° C.

Comparative Example 1

A rectangular-type nonaqueous electrolyte secondary battery having the same structure as that of Example 1 was prepared except that the numbers of positive electrode and negative electrode external terminals 3 and 4 were each decreased to one. It was examined whether or not the head sections of the positive electrode and negative electrode external terminals 3 and 4 were rotated when rotating force was applied to the head sections of the positive electrode and negative electrode external terminals 3 and 4, to find that these head sections were rotated under a torque of 2 Nm. Further, electric current was made to flow across the positive electrode and negative electrode external terminals 3 and 4 in the following condition to measure the temperatures of the head sections 3a and 4a of the positive electrode and negative electrode external terminals 3 and 4 by a thermocouple, to find the following results.

Energizing condition: circumferential temperature: 25° C., battery: in a half-charged state (SOC 50%). The battery was continuously energized by repeating charge/discharge every 10 sec. in the condition of a charge current of 200 A and a discharge current of 200 A.

After the continuous energization was continued for 30 min, the temperature of the top of the head section 3a of the positive electrode external terminal 3 was 80° C., the temperature of the top of the head section 4a of negative electrode external terminal 4 was 83° C.

It was confirmed from the above test results that the battery according to the embodiments was more resistant to the rotation of the external terminal, so that the temperature of the terminal was more scarcely raised even if large current was flowed, compared to the battery of Comparative Example.

Example 2

A rectangular-type nonaqueous electrolyte secondary battery having the structure shown in FIG. 23 was prepared. As the positive electrode, a sheet-like material was used which was prepared by forming an active material-containing layer containing lithium-cobalt oxide ($LiCoO_2$), a graphite powder as a conductive agent, and a polyvinylidene fluoride (PVdF) as a binder on each side of a current collector constituted of an aluminum or aluminum alloy foil. As the negative electrode, on the other hand, a sheet-like material was used which was prepared by forming an active material-containing layer containing a negative electrode active material powder ($Li_4Ti_5O_{12}$ powder) having a lithium absorption potential of 0.4 V or more in terms of open circuit potential based on the open circuit potential of a lithium metal, a carbon powder as a conductive agent, and a polyvinylidene fluoride (PVdF) as a binder on each side of a current collector constituted of an aluminum or aluminum alloy foil. As the electrode group 65, an electrode group was used which was produced by spirally winding the positive electrode and negative electrode with a separator being interposed therebetween and then pressing the whole body into a sectionally square form according to the sectional shape of a battery can. A nonaqueous liquid electrolyte was used as the liquid electrolyte.

As a battery of an example having the structure shown in FIG. 23, an aluminum alloy was used for a package can 61, a lid 62, positive electrode and negative electrode external terminals 63 and 64, and positive electrode and negative electrode internal leads 70 and 71. Further, PP was used for resin materials of an internal insulating body 69 and PFA (trademark: AP-230, manufactured by Daikin Industries, Ltd.) having a MFR of 2 g/10 min was used as an insulating gasket 65.

The battery size was as follows: width: 170 mm, thickness: 30 mm, and height: 110 mm. The positive electrode and negative electrode leads 70 and 71 and a lid 62 were produced with an aim at a structure in which each plate thickness $T_1$ of support plate 70a and 71a of these leads 70 and 71 was 2 mm, the plate thickness $T_2$ of the lid 62 was 1 mm, and the thickness $T_3$ of the residual wall thickness of a groove section 66b was 0.09 mm. Each length d of the support plates 70a and 71a in a direction parallel to the direction of the thickness of the battery was 22 mm and the length D of the inside dimension of the package can 61 in a direction parallel to the direction of the thickness of the battery was 28 mm. The ratio d/D was 0.786.

20 batteries which were each the same as that of Example 2 were manufactured to examine variation in the release pressure of the safety valve by using the following method to obtain the following results.

The residual wall thickness $T_3$ was as follows: average: 0.091 mm, maximum value (Max): 0.093 mm, minimum value (Min): 0.090 mm. The residual wall thickness was measured by using a dial gauge with a probe having 0.1 mm$\phi$ tip.

The working pressure of the safety valve was as follows: average: 0.80 MPa, maximum value (Max): 0.83 MPa, and minimum value (Min): 0.77 MPa.

Comparative Example 2

A rectangular type nonaqueous electrolyte secondary battery having the structure shown in FIGS. 29 to 31 was produced in the same manner as in Example except that the positive electrode and negative electrode leads 70 and 71 and the lid 62 were produced with an aim at a structure in which each plate thickness $T_1$ of the support plate 70a and 71a of these leads 70 and 71 was 1 mm, the plate thickness $T_2$ of the lid 62 was 2 mm, and the thickness $T_3$ of the residual wall thickness of the groove section 66b was 0.09 mm.

20 batteries which were each the same as that of Comparative Example 2 were manufactured to examine variation in the release pressure of the safety valve by using the following method to obtain the following results.

The residual wall thickness $T_3$ was as follows: average: 0.091 mm, maximum value (Max): 0.096 mm, minimum value (Min): 0.088 mm. The working pressure of the safety valve was as follows: average: 0.84 MPa, maximum value (Max): 0.91 MPa, and minimum value (Min): 0.74 MPa.

From the comparison between the results of Example 2 and Comparative Example 2, it is found that according to Example 2, the variation in the residual wall thickness $T_3$ and the variation in the working pressure of the safety valve are both smaller than those of Comparative Example 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
   a package can;
   an electrode group which is provided in the package can and comprises a positive electrode and a negative electrode;
   a lid provided to an opening part of the package can;
   positive electrode external terminals which are provided on the lid and electrically connected to the positive electrode;
   negative electrode external terminals which are provided on the lid and electrically connected to the negative electrode;
   a positive electrode external lead which is fixed to the positive electrode external terminals; and
   a negative electrode external lead which is fixed to the negative electrode external terminals.

2. A battery assembly comprising:
   two or more of the batteries as claimed in claim 1; and
   an external lead which electrically connects the batteries to each other.

3. The battery according to claim 1, wherein the positive electrode external terminals and the negative electrode external terminals are respectively fixed to the lid by caulking.

4. The battery according to claim 1, further comprising:
   a positive electrode internal lead which is provided in the package can and is fixed to the positive electrode external terminals;
   a negative electrode internal lead which is provided in the package can and is fixed to the negative electrode external terminals.

5. The battery according to claim 1, further comprising:
   a bolt comprising a polygonal head section and an axial section extended from the polygonal head section, wherein the positive electrode external lead comprises a through-hole into which the axial section of the bolt is inserted.

6. The battery according to claim 1, further comprising:
   a bolt comprising a polygonal head section and an axial section extended from the polygonal head section, wherein the negative electrode external lead comprises a through-hole into which the axial section of the bolt is inserted.

7. The battery according to claim 1, wherein the positive electrode external terminals and the negative electrode external terminals are surface-treated.

* * * * *